United States Patent [19]

Kashima

[11] Patent Number: 5,056,490

[45] Date of Patent: Oct. 15, 1991

[54] FUEL INJECTION CONTROL APPARATUS FOR ALCOHOL ENGINE

[75] Inventor: Takamitsu Kashima, Tokyo, Japan

[73] Assignee: Fuji Jukogyo Kabushiki Kaisha, Tokyo, Japan

[21] Appl. No.: 552,530

[22] Filed: Jul. 16, 1990

[30] Foreign Application Priority Data

Jul. 19, 1989 [JP] Japan .............................. 1-187816[U]
Sep. 29, 1989 [JP] Japan .............................. 1-256307[U]

[51] Int. Cl.$^5$ ............................................. F02M 51/00
[52] U.S. Cl. ................................... 123/478; 123/1 A
[58] Field of Search ................ 123/478, 1 A, 494, 381, 123/585

[56] References Cited

U.S. PATENT DOCUMENTS

| | | | |
|---|---|---|---|
| 4,494,517 | 1/1985 | Kratt et al. .......................... | 123/585 |
| 4,706,629 | 11/1987 | Wineland et al. .................... | 123/478 |
| 4,706,630 | 11/1987 | Wineland et al. .................... | 123/478 |
| 4,905,655 | 3/1990 | Maekawa ............................. | 123/494 |
| 4,913,099 | 4/1990 | Ota ..................................... | 123/478 |
| 4,955,345 | 9/1990 | Brown et al. ........................ | 123/381 |
| 4,957,087 | 9/1990 | Ota ..................................... | 123/1 A |
| 4,971,015 | 11/1990 | Gonze .................................. | 123/494 |

Primary Examiner—Raymond A. Nelli
Attorney, Agent, or Firm—Beveridge, DeGrandi & Weilacher

[57] ABSTRACT

In a fuel injection timing control apparatus for an alcohol engine for injecting a fuel containing alcohol to each of a plurality of cylinders at a predetermined timing, fuel injection start timing setting means causes to delay a fuel injection start timing more the higher an alcohol concentration outputted from an alcohol concentration sensor, when throttle full-open range discriminating means discriminates as a throttle full-open range and engine low speed range discriminating means (53) discriminates as an engine low speed range.

9 Claims, 17 Drawing Sheets

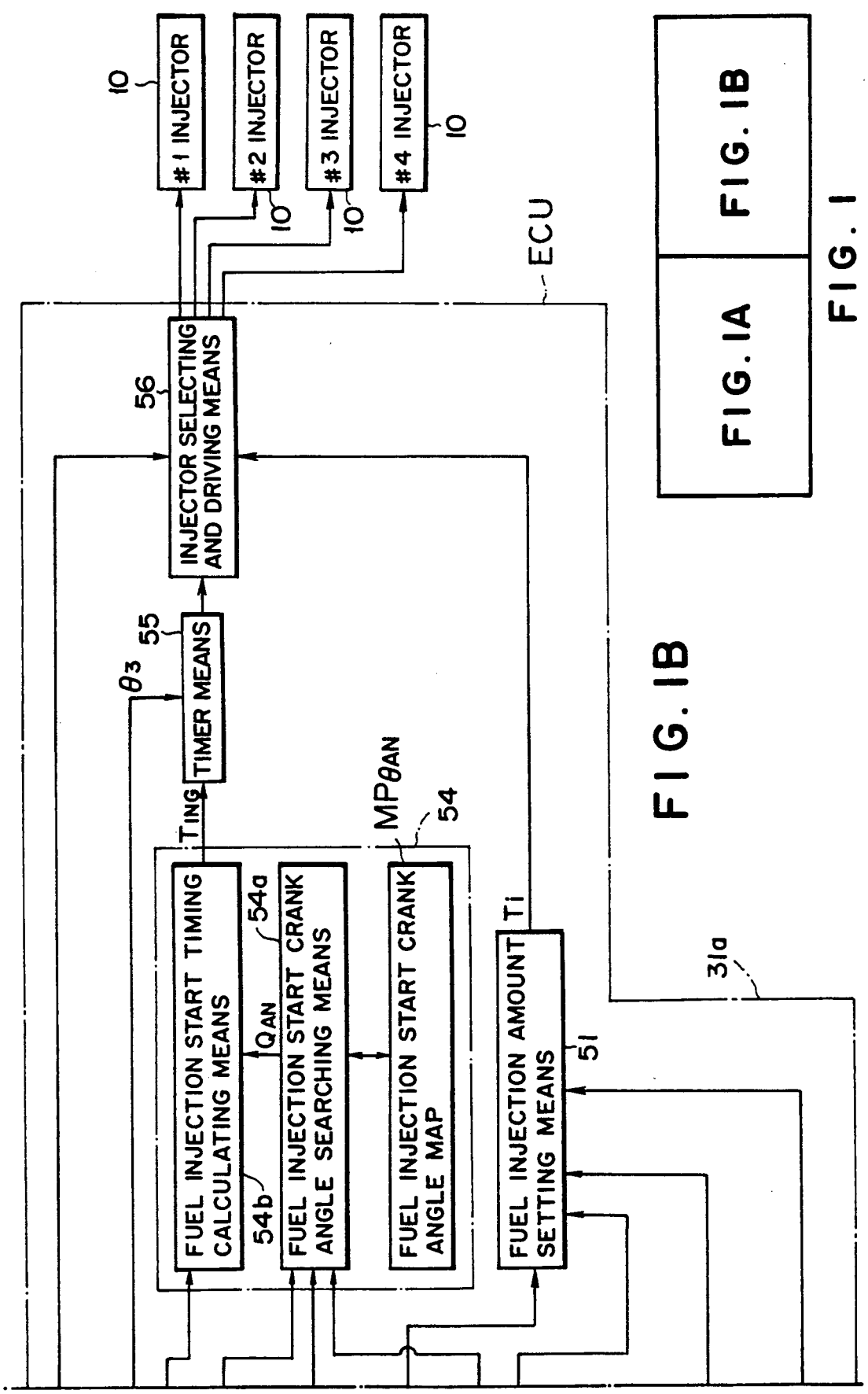

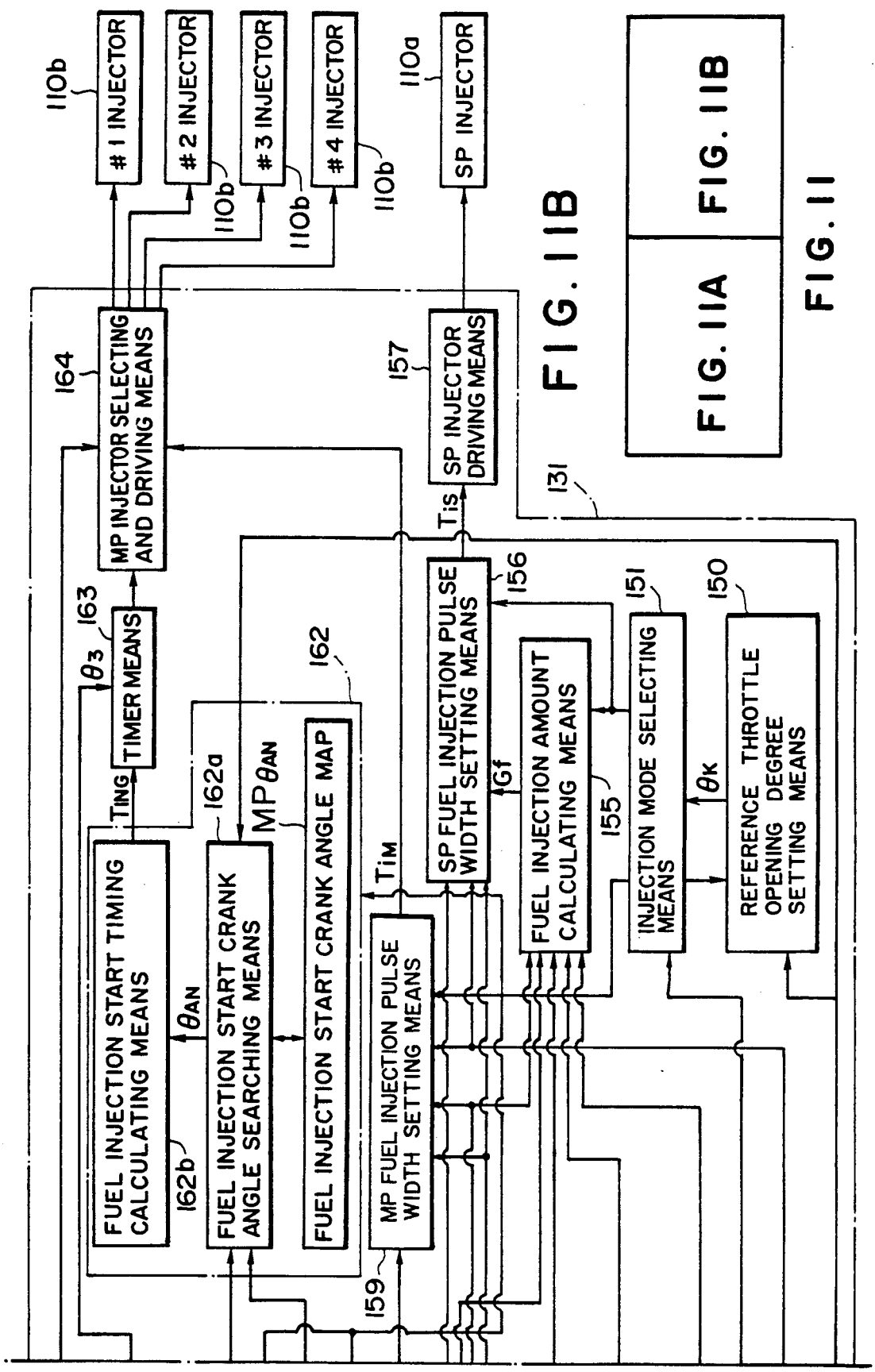

FUEL INJECTION CONTROL APPARATUS FOR ALCOHOL ENGINE

BACKGROUND OF THE INVENTION

The present invention relates to a fuel injection control apparatus for an alcohol engine capable of setting a fuel injection timing during high load running at a low speed in accordance with an alcohol concentration of fuel.

Alcohol engines for flexible fuel vehicles (FFV) have been developed recently which can use gasoline only, alcohol only or a mixed fuel of gasoline and alcohol.

The alcohol concentration (content) of the fuel used for an alcohol engine changes from 0% (only gasoline) to 100% (only alcohol) depending upon the circumstance when a user supplies the fuel. Since the theoretical air/fuel ratio changes with the alcohol concentration of the fuel, it is necessary to change an air/fuel ratio and an ignition timing properly in accordance with the alcohol concentration of the fuel, as described for example in Japanese Patent Laid-open Publication No. 56-66424.

Conventionally, the fuel injection timing has been set generally such that the fuel is injected within the intake pipe and that the fuel injection is terminated before the start of air intake, so as to enhance carburetion and stabilize combustion.

The cubic expansion coefficient of alcohol for the evaporation thereof is about three times as large as that of gasoline, so that the volumetric efficiency is lowered more by fuel evaporation as the alcohol concentration of the fuel becomes higher.

The fuel injection amount is determined in accordance with the above-described conventional technique irrespective of the alcohol concentration. The higher the alcohol concentration, the more the volumetric efficiency decreases due to carburetion. The phenomena results in an inability of proper air/fuel control, lower running performance and poor exhaust emission.

Particularly in the case of the low speed, high load running range where a fuel injection amount is large and the injected fuel remains within the intake pipe for the period sufficient for evaporation of the fuel, the volumetric efficiency is degraded to a great extent, and the above-stated problems become significant.

In order to maintain an air/fuel ratio of an alcohol engine at a theoretical air/fuel ratio, as disclosed in Japanese Patent Laid-open Publication No. 57-76231, it becomes necessary to increase the fuel injection amount as the alcohol concentration of the fuel increases so that the usual injector used by the general fuel injection system becomes inadequate in its capacity.

Specifically, the theoretical air/fuel ratio for a fuel of 100% alcohol is generally about one half that for a fuel of 100% gasoline. At the same running condition, it is therefore necessary to make the injector capacity about two times as large. Accordingly, a specific injector is required to ensure a requested fuel injection amount, resulting in an increase of cost.

SUMMARY OF THE INVENTION

The present invention has been made in consideration of the above circumstance. It is an object of the present invention to provide a fuel injection control apparatus for an alcohol engine wherein even under the low speed, high load running, the volumetric efficiency is not lowered, the air/fuel ratio can be controlled properly, and the running performance and exhaust emission is improved.

It is another object of the present invention to provide a fuel injection control apparatus for an alcohol engine wherein there is obtained a sufficient fuel injection amount which increases as the alcohol concentration becomes high, and even under the low speed, high load running, the volumetric efficiency is not lowered, the air/fuel ratio can be controlled properly, and the running performance and exhaust emission is improved.

According to the first aspect of the present invention, there is provided a fuel injection timing control apparatus for an alcohol engine for injecting a fuel containing alcohol to each of a plurality of 1 cylinders at a predetermined timing, comprising: a throttle opening degree sensor for detecting an actual throttle opening degree; a crank angle sensor for producing crank pulses at predetermined crank angles; engine speed calculating means responsive to the crank pulses for calculating an engine speed; throttle full-open range discriminating means responsive to the actual throttle opening degree for discriminating a throttle full-open range; engine low speed range discriminating means for discriminating an engine low speed range in accordance with the engine speed; an alcohol concentration sensor for detecting an alcohol concentration of the fuel; and fuel injection start timing setting means for delaying a fuel injection start timing more the higher the alcohol concentration outputted from said alcohol concentration sensor, when said throttle full-open range discriminating means discriminates as the throttle full-open range and said engine low speed range discriminating means discriminates as the engine low speed range.

With the fuel injection timing control apparatus as described above, it is first discriminated in accordance with a signal outputted from the throttle opening degree sensor whether the throttle full-open range or not. An engine speed is calculated in accordance with a signal outputted from the crank angle sensor.

It is then discriminated in accordance with the engine speed whether the engine low speed range or not.

If it is discriminated that the throttle is in a full-open range and that the engine is running in the low speed range, the fuel injection timing is delayed more the higher the fuel alcohol concentration. At this timing, the fuel is injected from the multi point injector.

BRIEF DESCRIPTION OF THE DRAWINGS

The drawings show embodiments of the present invention, in which:

FIGS. 1, 1A and 1B are functional block diagrams of a fuel injection control apparatus;

FIGS. 7, 7A-7C are flow charts showing the fuel injection control procedure;

FIGS. 11, 11A and 11B are block diagrams of a control apparatus in the second embodiment;

DETAILED DESCRIPTION OF THE PREFERRED EMBODIMENTS

Figure 2:
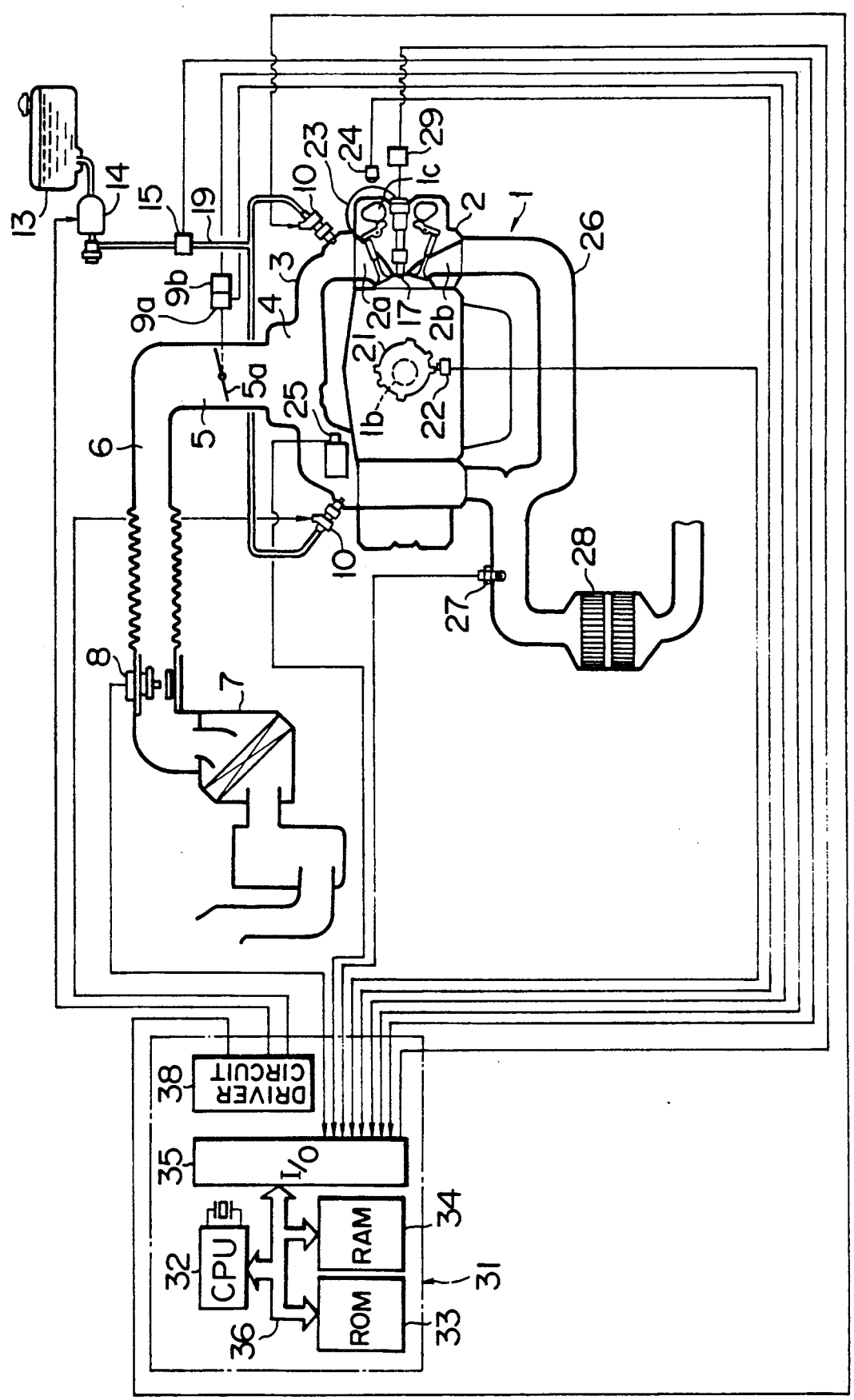
FIG. 2 is a schematic diagram of a control system.

In FIG. 2, an FFV alcohol engine is generally designated by reference numeral 1. This engine is constructed as a horizontally opposing four cylinder engine. An intake manifold 3 communicates with an intake port 2a formed in a cylinder head 2 of the engine 1. At the upstream location of the intake manifold 3, a throttle chamber 5 communicates therewith via an air chamber 4. At the upstream location of the throttle chamber 5, an air cleaner 7 is mounted via an intake pipe 6.

Just at the downstream location of the air cleaner 7 of the intake pipe 6, there is interposed an intake air sensor (in this embodiment, a hot wire type air flow meter). There is mounted at a throttle valve 5a in the throttle chamber 5 a throttle opening degree sensor 9a and an idling switch 9b for detecting a full-opening of the throttle valve 5a.

An injector 10 is mounted just upstream of the intake port 2a of each cylinder in the intake manifold 3. An ignition plug 17 is mounted for each cylinder on the cylinder head 2, with its tip end exposed within the combustion chamber.

The injector 10 communicates with a fuel tank 13 via a fuel path 19. A fuel pump 14 and an alcohol concentration sensor 15 are mounted on the fuel path 19 in this order as viewed from the fuel tank 13.

Within the fuel tank 13, there is stored a fuel which may contain only alcohol, gasoline, or a mixture thereof depending upon the choice of the driver the fuel.

A crank rotor 21 is coupled to a crank shaft 1b of the engine 1. A crank angle sensor 22 such as an electromagnetic pickup is mounted facing the outer periphery of the crank rotor 21 to detect a crank angle. A cam rotor 23 is coupled to a cam shaft 1b which rotates by ½ as the crank shaft 16 rotates once. A cam angle sensor 24 is mounted facing the outer periphery of the cam rotor 23.

Figure 3:
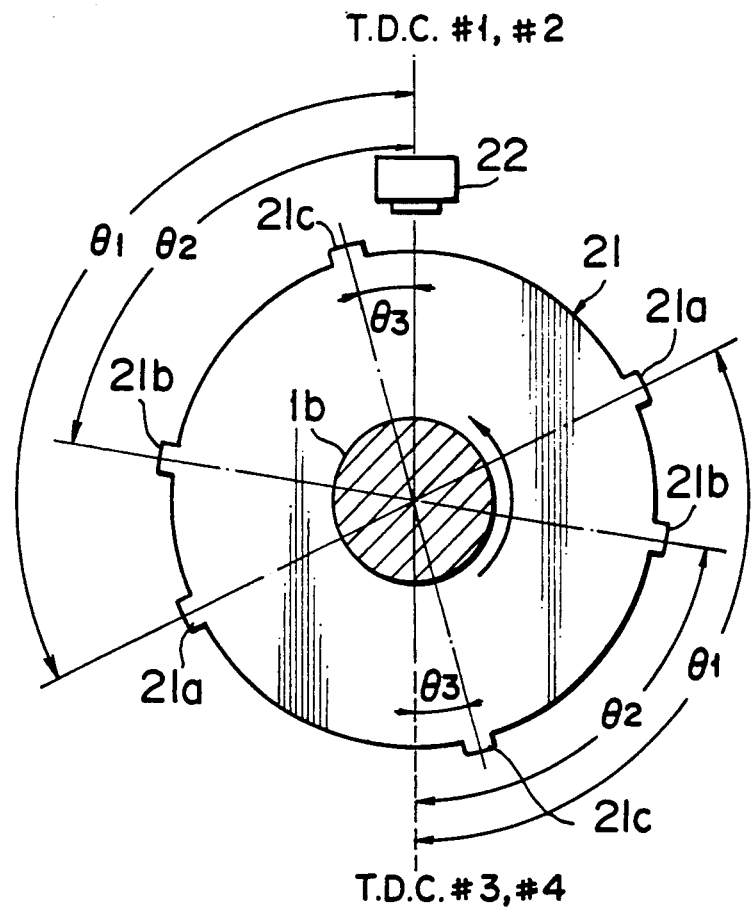
FIG. 3 is a front view showing a crank rotor and a crank angle sensor.

As shown in FIG. 3, projections 21a, 21b and 21c are formed at the outer periphery of the crank rotor 21. Each projection 21a, 21b, and 21c is formed at positions $\theta 1$, $\theta 2$ and $\theta 3$ before compression top dead centers (BTDC) of each cylinder. The projection 21a indicates a reference crank angle for setting ignition timing. A transition time from the projection 21a to the projection 21b is used for calculating an angular velocity $\omega$. The projection 21c indicates a fixed ignition timing and a reference crank angle used for setting a fuel injection start crank angle $\theta AN$.

Figure 4:
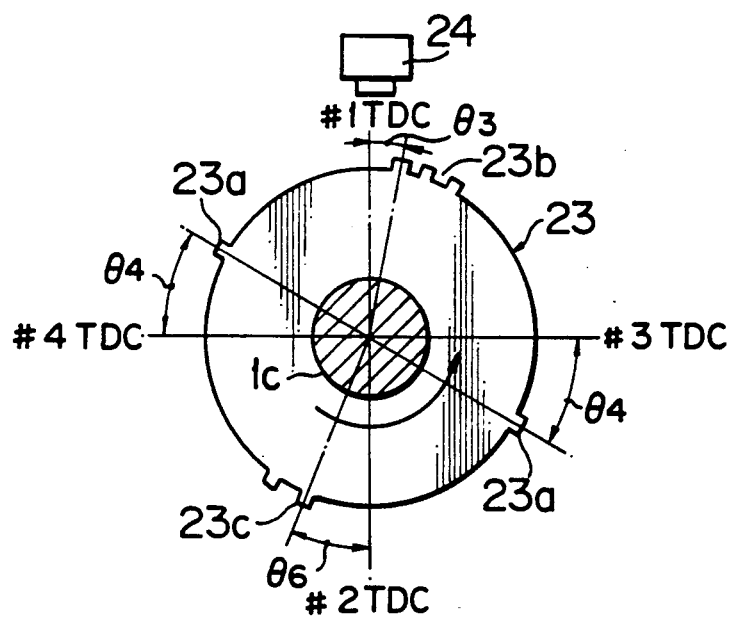
FIG. 4 is a front view showing a cam rotor and a cam angle sensor.

As shown in FIG. 4, cylinder discriminating projection groups 23a, 23b, 23c and 23d are formed at the outer periphery of the cam rotor 23. Each of the projections 23a and 23d is formed at a position 24 after the compression top dead center (ATDC) of corresponding cylinders #3, #4. The projection group 23b is constructed of three projections. The first projection is formed at a position $\theta 5$ after the compression top dead center (ATDC) of cylinder #1. The projection group 23c is constructed of two projections. The first projection is formed at a position $\theta 6$ after the compression top dead center (ATDC) of cylinder #2.

Figure 5:
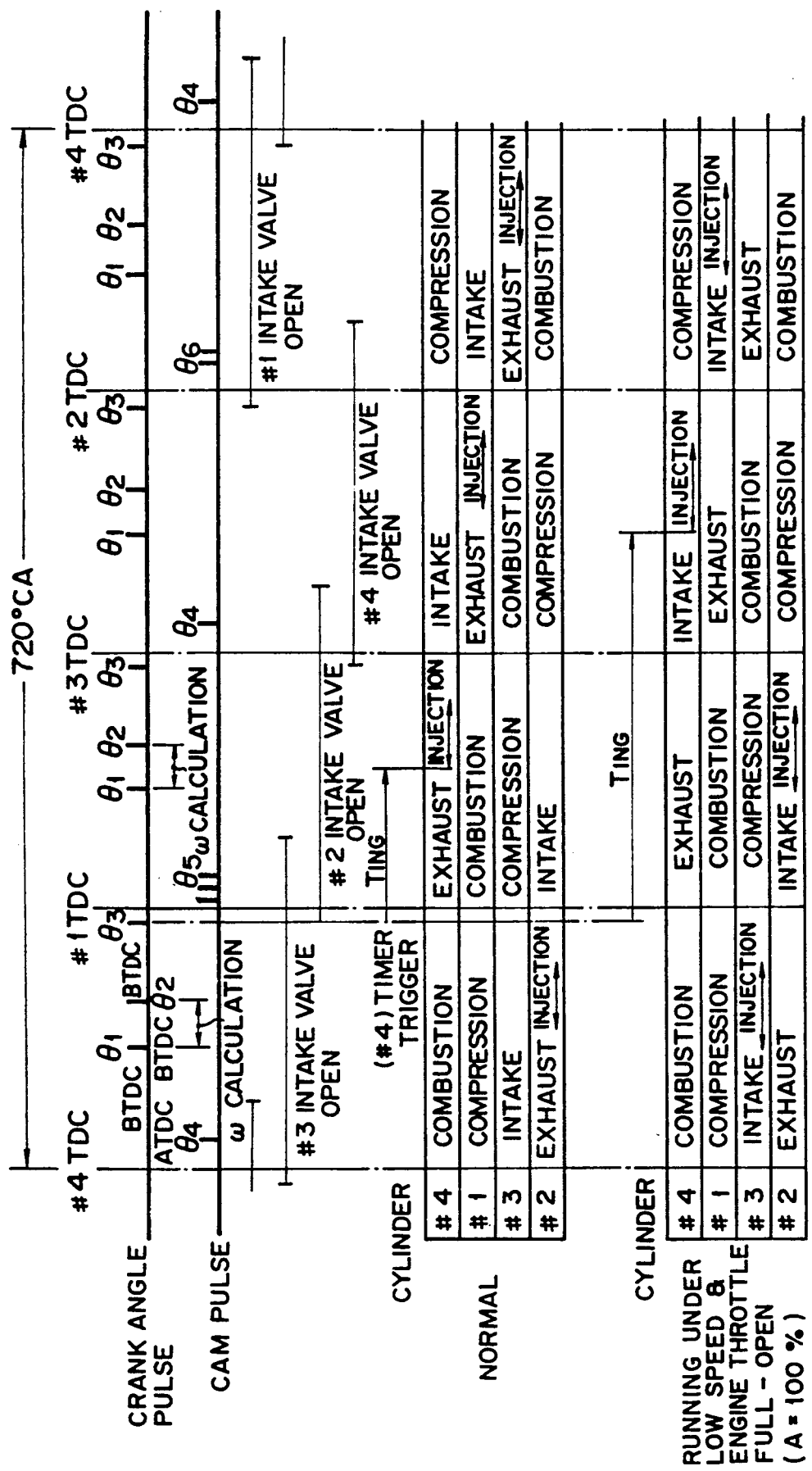
FIG. 5 is a timing chart of fuel injection timings.

In this embodiment shown in FIGS. 3 and 4, $\theta 1 = 97°$, $\theta 2 = 65°$, $\theta 3 = 10°$, $\theta 4 = 20°$, $\theta 5 = 5°$, and $\theta 6 = 20°$. As shown in FIG. 5, for example, if the cam angle sensor 24 detects cam pulses of the projection group 23b, it can be discriminated that a crank pulse detected thereafter by the crank angle sensor 22 is a signal for the cylinder #3.

If a cam pulse of the projection 23d is detected after the cam pulses of the projection group 23b, it can be discriminated that a crank pulse detected thereafter by the crank angle sensor 22 is a signal for the cylinder #2. Similarly, it can be discriminated that a crank pulse detected after detecting a cam pulses of the projection group 23c indicates a signal for the cylinder #4, and that if a cam pulse of the projection 23a is detected after the cam pulses of the projection group 23c, a crank pulse detected thereafter indicates a signal for the cylinder #1.

It can also be discriminated that a crank pulse detected by the crank angle sensor 22 after the cam angle sensor 24 detects cam pulses indicates the reference crank angle ($\theta 1$) of the corresponding cylinder.

A coolant temperature sensor 25 is mounted at a coolant path (not shown) formed in the intake manifold 3 and serving as a riser.

An 02 sensor 27 is mounted on an exhaust pipe 26 communicated with an exhaust port 2b of the cylinder head 2. Reference numeral 28 represents a catalytic converter.

(Circuit Arrangement of Control Apparatus)

Reference numeral 31 represents a control apparatus. In the control apparatus 31, a CPU (central processing unit) 32, ROM 33, RAM 34 and I/O interface 35 are interconnected together via a bus line 36. To input ports of the I/O interface 35, there are connected the sensors 22, 24, 8, 9a, 25, 27, 15 and the idling switch 9b. To output ports of the I/O interface 35, there are connected the ignition plug 17 via an igniter 29, and the injector 10 and the fuel pump 14 via a driver circuit 38.

ROM 33 stores therein control programs and fixed data. As the fixed data, there is a fuel injection start crank angle map MP$\theta$AN to be described later.

RAM 34 stores therein signals outputted from sensors and processed, and data processed by CPU 32.

In accordance with control programs stored in ROM 33, CPU 32 calculates a pulse width of a pulse for driving the injector by using various data stored in RAM 34.

(Functional Structure of Control Apparatus)

Figure 1A:
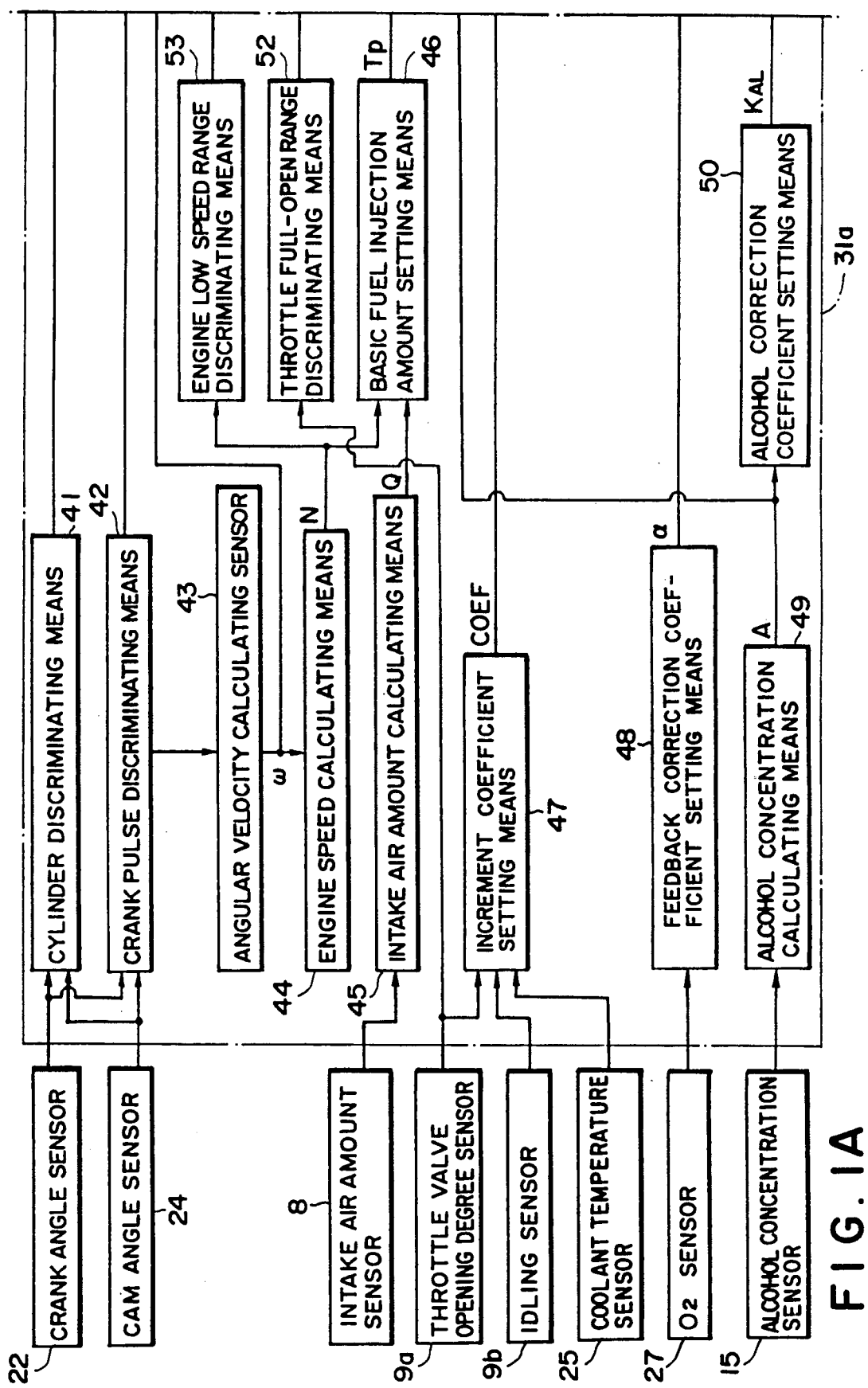

As shown in FIG. 1, the control apparatus 31 is constructed of cylinder discriminating means 41, crank pulse discriminating means 42, angular velocity calculating means 43, engine speed calculating means 44, intake air amount calculating means 45, basic fuel injection amount setting means 46, increment coefficient setting means 47, feedback correction coefficient setting means 48, alcohol concentration calculating means 49, alcohol correction coefficient setting means 50, fuel injection amount setting means 51, throttle full-open range discriminating means 52, engine low speed range discriminating means 43, fuel injection start timing setting means 54, timer means 55, and injector selecting and driving means 56.

The cylinder discriminating means 41 discriminates, in accordance with the cam pulses from the cam angle sensor 24, that the crank pulse detected thereafter by the crank angle sensor 22 indicates which cylinder.

The crank pulse discriminating means 42 discriminates that the crank pulse outputted from the crank angle sensor 22 after the cam pulses is outputted from the cam angle sensor 24, indicates with projections 21a to 21c.

The angular velocity calculating means 43 measures a transition time t between the crank pulses of the projection 21a and the projection 21b discriminated by the crank pulse discriminating means 42, and calculates an angular velocity ω using the transition time t and a difference angle ($\theta 1 - \theta 2$)

$$\left( \omega = \frac{d(\theta 1 - \theta 2)}{dt} \right)$$

The engine speed calculating means 44 calculates an engine speed $$N \left( N = \frac{60}{2\pi} \omega \right)$$

in accordance with the angular velocity ω.

The intake air amount calculating means 45 calculates an intake air mount Q by using an output signal from the intake air amount sensor 8.

The basic fuel injection amount setting means 46 sets a basic fuel injection amount Tp in accordance with the engine speed N and the intake air amount Q.

Specifically, the basic fuel injection amount Tp is calculated by an equation $Tp = K \times Q/N$ where K is a constant, or by searching a map by using the engine speed N and the intake air amount Q as its key parameters. In this embodiment, the basic fuel injection amount Tp is set by using the above equation.

It is assumed that the basic fuel injection amount Tp is for a fuel made of 100% gasoline (alcohol concentration 0%).

The increment coefficient setting means 47 reads a throttle opening degree (θ) signal from the throttle opening degree sensor 9a, an ON/OFF signal from the idling switch 9b, and a coolant temperature (Tw) signal from the coolant temperature sensor 25, and sets an increment coefficient COEF in association with the read signals. The increment coefficient COEF includes acceleration/deceleration correction, full-open increment amount correction, after-idling increment amount correction, coolant temperature correction and the like in accordance with the read signals.

The feedback correction coefficient setting means 48 reads an output voltage from the 02 sensor to compare with a predetermined slice level and sets an air/fuel ratio feedback correction coefficient α by means of a proportion-integration control.

If the 02 sensor is inactive, the air/fuel ratio feedback correction coefficient α is set to 1.0, terminating an air/fuel ratio feedback control.

The alcohol concentration calculating means 49 reads an output signal from the alcohol concentration 15 and calculates an alcohol concentration A of the fuel to be supplied to the injector 10.

The alcohol correction coefficient setting means 50 sets an alcohol correction coefficient KAL corresponding to the alcohol concentration A.

The alcohol correction coefficient KAL is used for correcting a theoretical air/fuel ratio which differs depending upon the alcohol concentration A. Specifically, a theoretical air/fuel ratio for 100% gasoline (A=0%) is 14.9 for example, whereas that for 100% alcohol (methanol) (A=100%) is 6.45. The higher the alcohol concentration A, the lower the theoretical air/fuel ratio. It is therefore necessary to increase the fuel injection amount for the higher alcohol concentration assuming the same engine running conditions.

Figure 8:
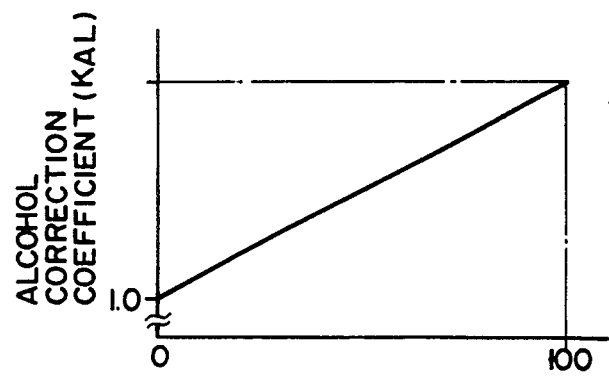
FIG. 8 illustrates the relationship between the alcohol concentration and an alcohol correction coefficient.

As described previously, in this embodiment, the basic fuel injection amount Tp is set assuming the alcohol concentration A=0% (gasoline 100%). Accordingly, the alcohol concentration correction coefficient KAL is set at 1.0 for the alcohol concentration A=0% (gasoline 100%), so that as shown in FIG. 8, as the alcohol concentration A rises, the correction coefficient rises (for the case of methanol, KAL=14.9/6.45≒2.31 for A=100%, and for the case of ethanol, KAL=14.9/9.01≒1.66 for A=100%).

The alcohol correction coefficient KAL can thus be obtained by using the function of the alcohol concentration A (KAL=f(A)).

The alcohol correction coefficient KAL may be determined searching a map by using the alcohol concentration A as a key parameter.

Use of methanol or ethanol is determined beforehand, and the corresponding equation or map for setting the alcohol correction coefficient KAL is stored in ROM 33.

The fuel injection amount setting means 51 corrects the basic fuel injection amount Tp set by the basic fuel injection amount setting means 46, in accordance with the increment coefficient COEF and the alcohol correction coefficient KAL, and sets a fuel injection amount Ti in accordance with the air/fuel ratio feedback correction coefficient α (Ti=Tp×COEF×α×KAL).

The throttle full-open range discriminating means 52 compares the throttle opening degree θ with a predetermined reference throttle opening degree θs. If θ > θs, it discriminates as a throttle full-open range.

The engine low speed range discriminating means 53 compares the engine speed N with a predetermined reference engine speed Ns (e.g., 1000 to 1500 rpm). If N ≦ Ns, it discriminates as a low speed range.

The fuel injection start timing setting means 54 is constructed of fuel injection start crank angle searching means 54a, fuel injection start timing calculating means 54b, and the fuel injection start crank angle map MPθAN. The searching means 54a, in response to the discrimination results by the throttle full-open range discriminating means 52 and the engine low speed range discriminating means 53, sets a predetermined fuel injection start crank angle θAN or an angle obtained by using the alcohol concentration A calculated by alcohol concentration calculating means 49.

Specifically, if the throttle full-open range discriminating means 52 discriminates as the throttle full-open range and if the engine low speed range discriminating means 53 discriminates as the engine low speed range, the fuel injection start crank angle map MPθAN is searched by using as a parameter the alcohol concentration A, to thereby set the fuel injection start crank angle θAN.

Figure 6:
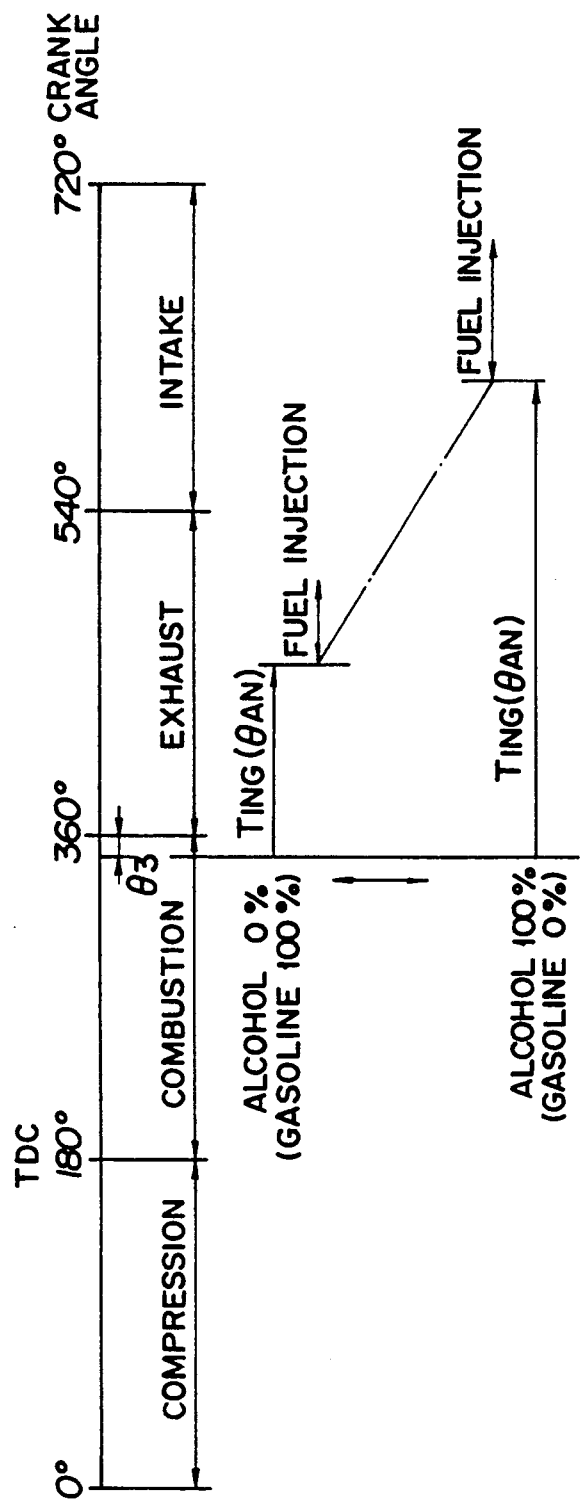
FIG. 6 illustrates the relationship between an alcohol concentration and a fuel injection start timing.

As shown in FIG. 6, in respective areas of the fuel injection start crank angle map MPθAN, there are stored fuel injection start crank angles θAN which have been set such that as the alcohol concentration A changes from 0% to 100%, the fuel injection start timing is delayed from the exhaust air stroke side to the intake air stroke side.

The fuel injection start crank angle θAN is a crank angle relative to a reference point (zero point) of the projection 21c.

If the throttle full-open range discriminating means 52 discriminates as other than the throttle full-open range or if the engine low speed range discriminating means 53 discriminates as other than the engine low speed range, the fuel injection start crank angle θAN is set at the predetermined fixed fuel injection start crank angle. This fixed fuel injection start crank angle is set such that the fuel injection will complete before the start of the intake air stroke.

The calculating means 54b calculates a fuel injection start timing TING (TING=θAN/ω) in accordance with the fuel injection start crank angle θAN and the angular velocity ω calculated by the angular velocity calculating means 43.

The timer means 55 is set with the fuel injection start timing TING and starts counting when the crank pulse discriminating means 42 discriminates crank pulse at the projection 21c.

The injector selecting and driving means 57 is responsive to a trigger pulse indicative of the count end from timer means 56, and outputs a drive pulse corresponding to the fuel injection amount Ti to the injector 10 of the corresponding cylinder discriminated by the cylinder discriminating means 41.

Operation

Next, the fuel injection control procedure of the control apparatus 31 will be described with reference to the flow chart shown in FIG. 7.

First, at a step S101, a crank pulse and cam pulses outputted from the crank angle sensor 22 and the cam angle sensor 25 are used. At a step S102, a corresponding cylinder is discriminated in accordance with the read cam pulses.

Thereafter at a step S103, upon interrupt by the cam pulse, a crank pulse is discriminated. At a step S104, the angular velocity ω is calculated from the time period between both crank pulses of the projections 21a and 21b and the difference angle ($\theta 1 - \theta 2$) therebetween ($\omega = d(\theta 1 - \theta 2)/dt$).

Next, at a step S105 the engine speed N is calculated from the angular velocity ω calculated at the step S104 ($N = (60/2\pi) \times \omega$).

Thereafter at a step S106, a signal is read from the intake air amount sensor 8 to calculate the intake air amount Q. At a step S107, the basic fuel injection amount Tp is set in accordance with the engine speed N calculated at the step S105 and the intake air amount Q calculated at the step S106 ($Tp = K \times Q/N$ K: constant).

Next, at a step S108, a coolant temperature Tw and a throttle opening degree θ respectively outputted from the coolant temperature sensor 25 and the throttle opening degree sensor 9a and an output from the idling switch are read. At a step S109, in accordance with the information read at the step S108, the increment coefficient COEF is set in association with the coolant temperature correction, the acceleration/deceleration correction, the full-open increment amount correction, the after-idling increment amount correction, and the like.

Thereafter at a step S110, the air/fuel ratio feedback correction coefficient α is set in accordance with an output signal from the O2 sensor 27. At a step S111, the alcohol concentration A is calculated in accordance with an output signal from the alcohol concentration sensor 15. At a step S112, the alcohol correction coefficient KAL is set in accordance with the alcohol concentration A calculated at the step S111.

At a step S113, the fuel injection amount Ti is calculated by using the equation $$Ti = Tp \times COEF \times \alpha \times KAL$$

in accordance with the basic fuel injection amount Tp set at the step S107, the increment coefficient COEF set at the step S109, the air/fuel ratio feedback correction coefficient α set at the step S110, and the alcohol correction coefficient KAL set at step S112.

Next, at a step S114, the throttle opening degree θ read at the step S108 is compared with the predetermined reference throttle opening degree θs. If $\theta > \theta s$, it is discriminated as the throttle full-open range and the control advances to a step S115. If $\theta \leq \theta s$, it is discriminated as other than the throttle full-open range and the control advances to a step S116.

At the step S115 the engine speed N calculated at the step S105 is compared with the predetermined reference engine speed Ns. If $N > Ns$, it is discriminated as a medium and high speed range and the control advances to the step S116. If $N \geq Ns$, it is discriminated as the low speed range and the control advances to a step S117.

At the step S116, the fixed fuel injection start crank angle is set as the fuel injection start crank angle θAN, i.e., a normal injection timing is set.

If it is discriminated at the steps S114 and S115 as the throttle full-open range and as the low speed range, the control advances to the step S117 whereat the fuel injection start crank angle map MPθAN is searched by using as the parameter the alcohol concentration A calculated at the step S111, to thereby set the fuel injection start crank angle θAN.

Next, at a step S118 the fuel injection start timing TING is calculated in accordance with the fuel injection start crank angle θAN set at the step S116 or step S117 and the angular velocity calculated at the step S104 (TING=θAN/ω).

Thereafter at a step S119 the fuel injection start timing TING calculated at the step S118 is set at a timer of the timer means 55. At a step S120 the timer is driven upon reception of a trigger signal as the crank pulse at the projection 21c.

At a step S121, a drive pulse corresponding to the fuel injection amount Ti set at the step S113 is outputted to the injector 10 of the corresponding cylinder, when the timer driven at the step S120 reaches the fuel injection start timing TING.

In the above manner and as shown in FIG. 5, the higher the alcohol concentration A, the more the fuel injection start timing TING at the throttle full-open range and the low speed range, i.e., during a low speed, high load running, is delayed from the normal fixed fuel injection start crank angle within the exhaust air stroke to the intake air stroke side. Accordingly, carburetion of fuel in the intake path is suppressed and the carburetion time is shortened, resulting in good volumetric efficiency. Further, fuel combustion is optimized since the injection timing is changed with the alcohol concentration A.

During the running conditions other than the low speed, high load running, the injection timing similar to conventional is set, i.e., fuel is injected before the start of the intake stroke, thereby improving carburetion and stabilizing combustion.

Figure 9:
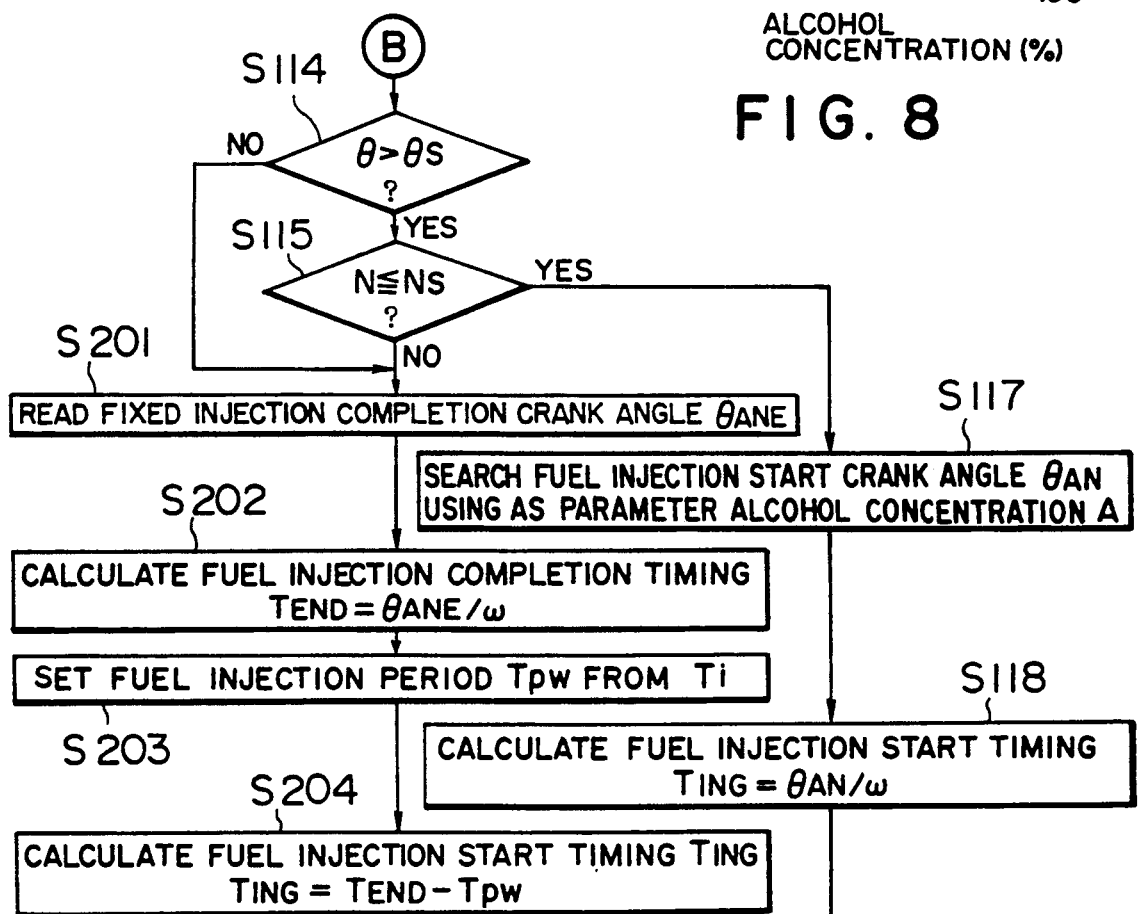
FIGS. 9 and 10 show another example of the flow chart and the timing chart, respectively.

FIG. 9 is a flow chart where the fuel injection end timing is fixed during the running conditions other than the low speed, high load running.

Figure 7A:
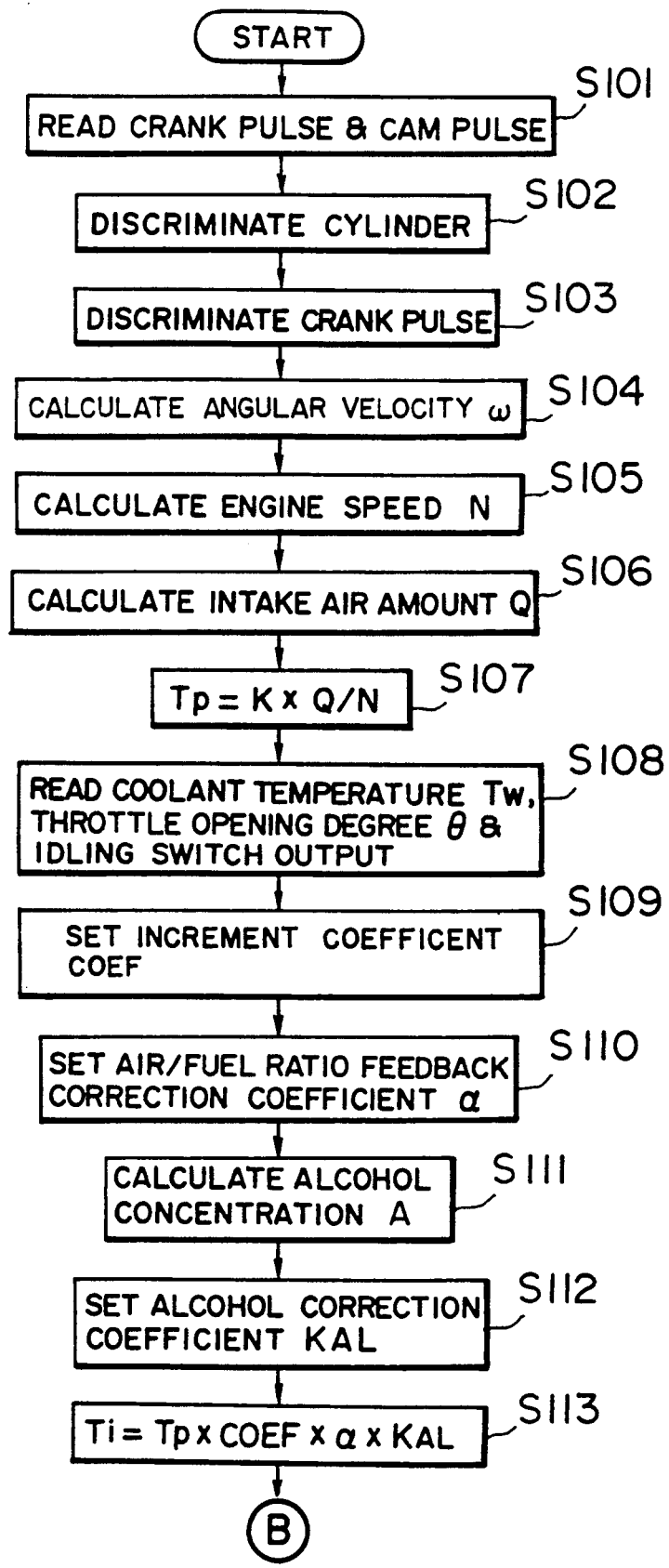
Figure 7C:
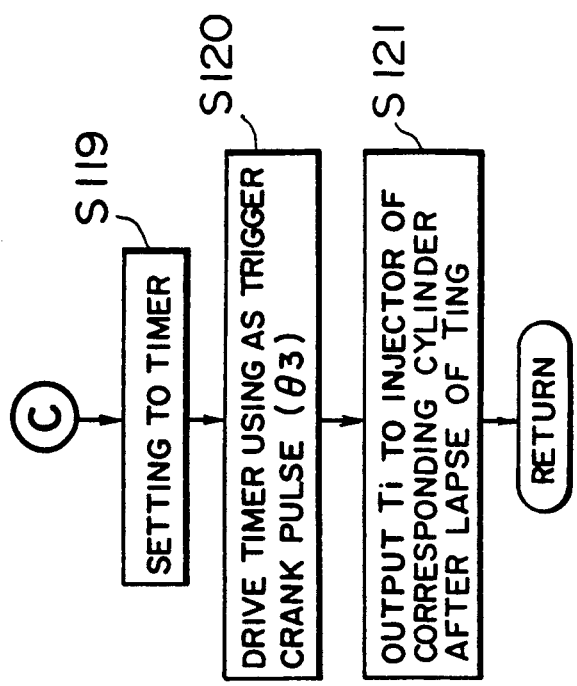
Figure 7B:
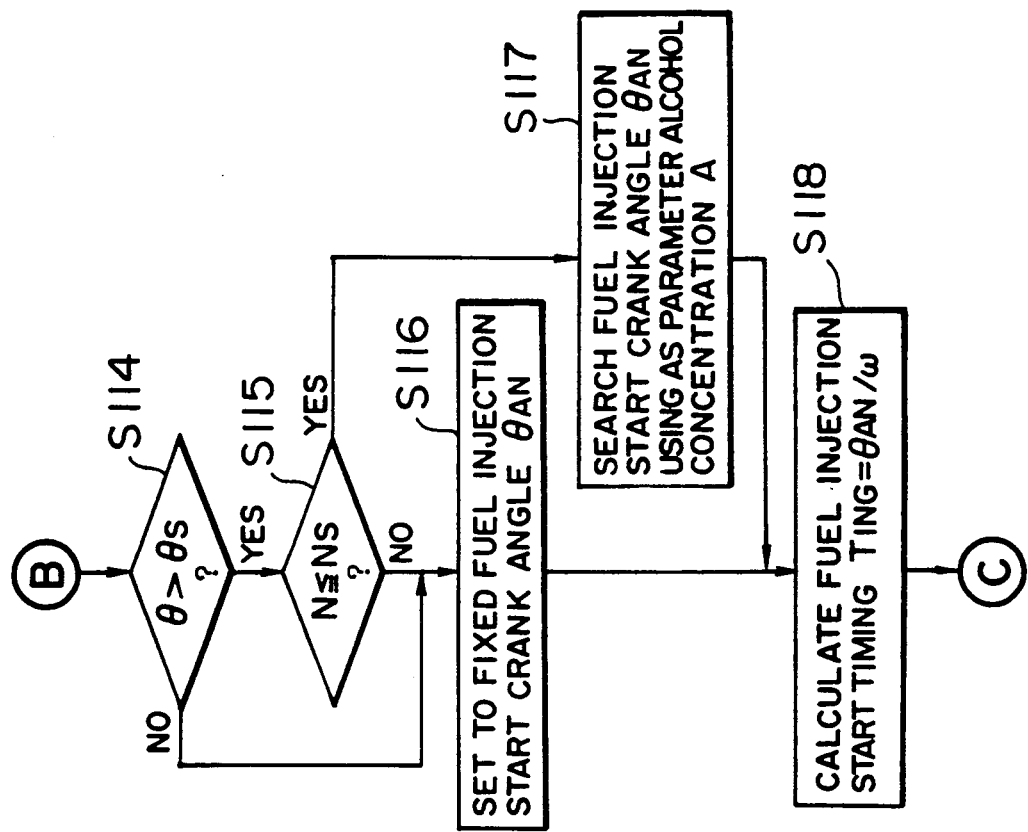

This flow chart differs from that shown in FIG. 7 in the processes B to C only. If it is discriminated other than the throttle full-open range at the step S114 ($\theta \leq \theta s$) or if it is discriminated other than the low speed range at the step S115 (N>Ns), then the control advances to a step S201 whereat a predetermined fixed fuel injection end crank angle $\theta$ANE is read, and at a step S202 a fuel injection end timing TEND is calculated in accordance with the fixed injection end crank angle $\theta$ANE read at the step S201 and the angular velocity $\theta$ calculated at the step S104 (TEND=$\theta$ANE/$\omega$).

Figure 10:
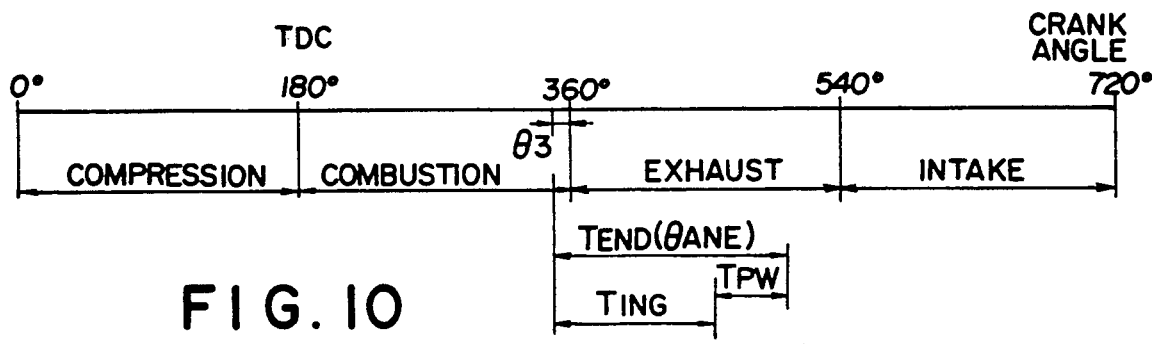

The fixed injection end crank angle $\theta$ANE is a crank angle relative to a reference point (zero point) of the projection 21c as shown in FIG. 10.

At a step S203 the fuel injection period Tpw is set in accordance with the fuel injection amount Ti set at the step S113.

At a step S204, the fuel injection start timing TING is calculated in accordance with the fuel injection end timing TEND calculated at the step S202 and the fuel injection period Tpw calculated at the step S203 (TING=TEND−Tpw).

At the step S119, the fuel injection start timing TING calculated at the step S204 is set to the timer.

In the embodiment shown in the figures, the fuel injection control by the time control scheme has been described. This invention is also applicable to the fuel injection control through the angle control scheme.

As seen from the foregoing description of the embodiment of this invention, the control apparatus is constructed of the throttle full-open range discriminating means for discriminating a throttle full-open range in accordance with an output signal from the throttle opening degree sensor, engine revolution number calculating means for calculating an engine speed in accordance with an output signal from the crank angle sensor, engine low speed range discriminating means for discriminating an engine low speed range in accordance with an engine speed calculated by engine speed calculating means, and fuel injection start timing setting means for setting, if the throttle full-open range discriminating means discriminates as the throttle full-open range and the engine low speed range discriminating means discriminates as the engine low speed range, the fuel injection start timing is delayed more the higher the fuel alcohol concentration. Accordingly, carburetion of alcohol fuel during the low speed, high load running can be suppressed, and the carburetion time can be shortened.

As a result, it is possible to prevent the volumetric efficiency from being lowered during the low speed, high load running, to thereby ensure proper combustion, improved running performance and exhaust emission.

Figure 12:
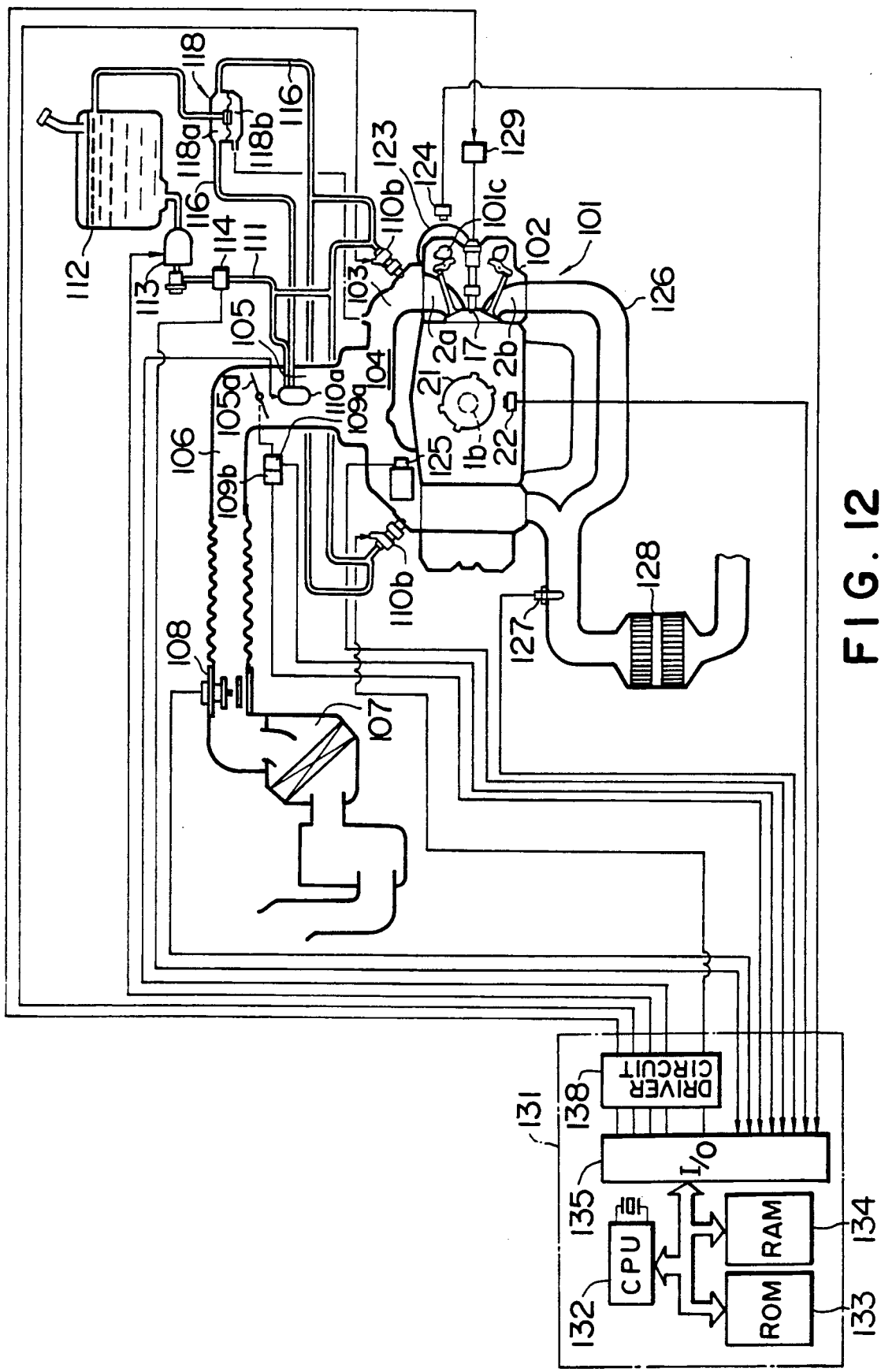
FIG. 12 is a schematic diagram of a control system in the second embodiment.

FIG. 12 shows second embodiment of this invention. A single point injector (hereinafter called an SP injector) 110a is mounted at the downstream of a throttle valve 105 for an intake manifold 103, and a multi point injector (hereinafter called an MP injector) 110b is mounted just at the upstream of each air intake port 102 for each cylinder. An ignition plug 117 is mounted at a cylinder head 102 for each cylinder, exposing its tip within the combustion chamber.

The SP injector has a different fuel injection capacity from the MP injector. The total maximum injection amount of four MP injectors 110b is made larger than the maximum injection amount of one SP injector 101a. The fuel injection scheme is switched between a single point injection by one SP injector 101a and a multi point injection by four MP injectors 110b.

The SP and MP injectors 110a and 110b communicate with a fuel tank 112 via a fuel path 111. Within the fuel tank 112, there is stored a fuel which may contain only alcohol, gasoline, or a mixture thereof depending upon the choice of the driver.

A fuel pump 113 and an alcohol concentration sensor 114 are interposed at the fuel path 111 in this order as viewed from the fuel tank 112. The fuel path 111 communicates with a fuel chamber 118a of a pressure regulator 118 via a return path 116. The downstream of this fuel chamber 118a communicates with the fuel tank 112.

As indicated by a one-dot-chain line, a pressure regulating chamber 118b of the pressure regulator 118 communicates with the intake manifold 103. The pressure difference between the fuel pressure within the fuel path 111 and the internal pressure of the intake manifold 103 is maintained constant by the pressure regulator 118. The fuel injection amount of the SP and MP injectors 110a and 110b is controlled so as not to be influenced by a change in the internal pressure of the intake manifold 103.

A crank rotor 121 is coupled to a crank shaft 101b of an engine 101. A crank angle sensor 122 such as an electromagnetic pickup for detecting the crank angle is mounted facing the outer periphery of the crank rotor 121. A cam rotor 123 is coupled to a cam shaft 101c which rotates by ½ as the crank shaft rotate once. A cam angle sensor 144 is mounted facing the outer periphery of the cam rotor 123.

Projections 121a, 121b and 121c are formed at the outer periphery of the crank rotor 121 in the same condition as the projections 21a, 21b and 21c of the first embodiment as shown in FIG. 3. The projections 121a, 121b, and 121c also function as same as the projections 21a, 21b and 21c of the first embodiment.

Similarly, cylinder discriminating projection groups 123a, 123b and 123c are formed at the outer periphery of the cam rotor 123 to function in the same way as the projection groups 23a, 23b, 23c and 23d of the first embodiment as shown in FIG. 4.

A coolant temperature sensor 125 is mounted at a coolant path (not shown) formed in the intake manifold 103 and serving as a riser.

An 02 sensor 127 is mounted on an exhaust pipe 126 communicating with an exhaust port 102b of the cylinder head 102. Reference numeral 123 represents a catalytic converter.

Circuit Arrangement of Control Apparatus

Reference numeral 131 represents a control apparatus of the second embodiment. In the control apparatus 131, a CPU (central processing unit) 132, ROM 133, RAM 134 and I/O interface 135 are interconnected together via a bus line 136. To input ports of the I/O interface 135, there are connected the sensors 122, 124, 108, 109a, 125, 127, 115 and the idling switch 109b. To output ports of the I/O interface 135, there are connected the ignition plug 117 via an igniter 129, and the injectors 110a and 110b and the fuel pump 114 via a driver circuit 138.

The ROM 133 stores therein control programs and fixed data. As the fixed data, there is a fuel injection start crank angle map MP$\theta$AN to be described later.

The RAM 134 stores therein signals outputted from sensors and processed, and data processed by CPU 132.

In accordance with control programs stored in the ROM 133, the CPU 132 calculates a pulse width of a pulse for driving the injectors 110a and 110b by using various data stored in RAM 134.

Functional Structure of Fuel Injection Apparatus

Figure 11A:
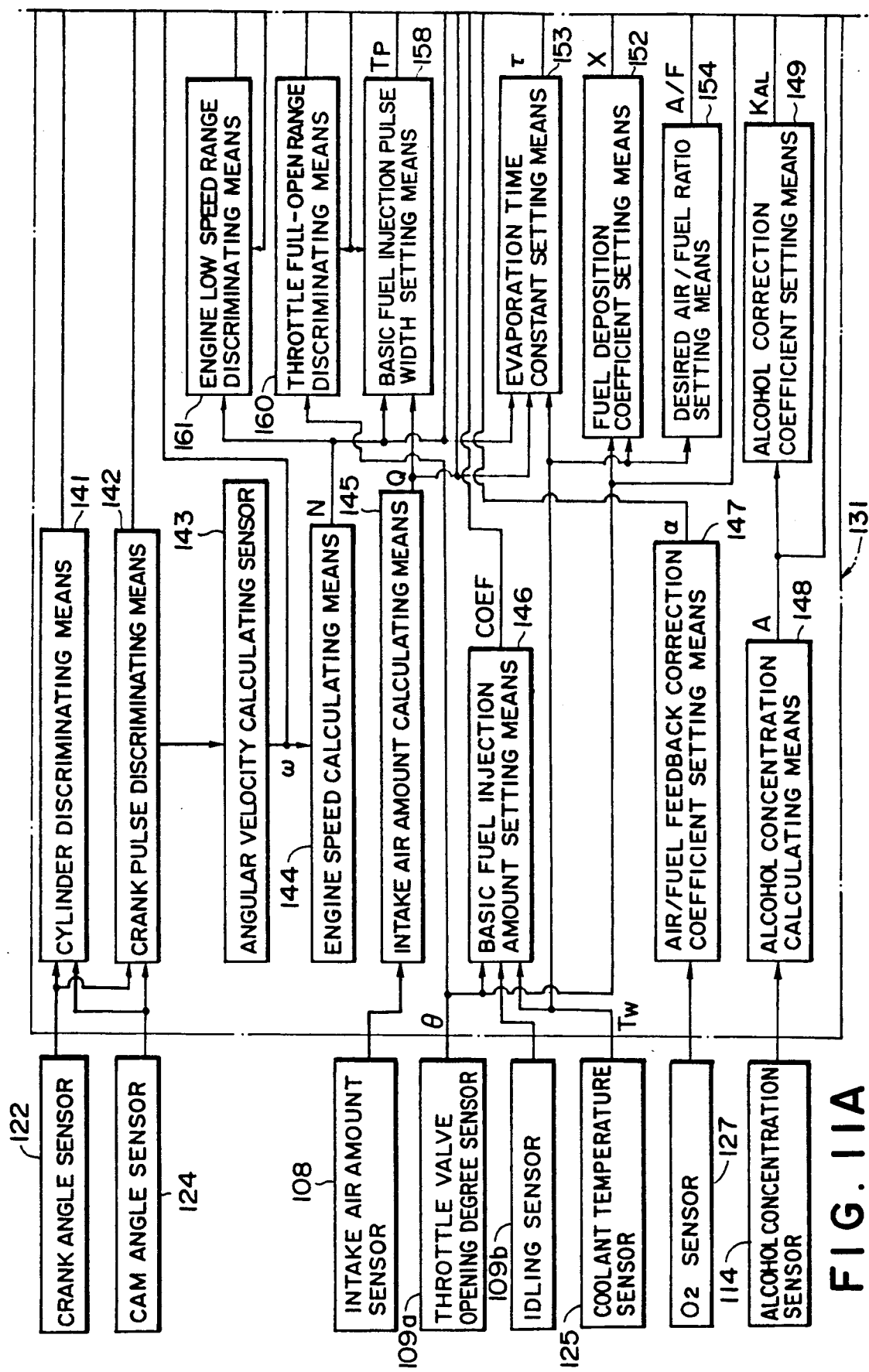

As shown in FIG. 11, the control apparatus 131 includes cylinder discriminating means 141, crank pulse discriminating means 142, angular velocity calculating means 143, engine speed calculating means 144, intake air amount calculating means 145, increment coefficient setting means 146, feedback correction coefficient setting means 147, alcohol concentration calculating means 148, alcohol correction coefficient setting means 149, basic fuel injection pulse width setting means 158, MP fuel injection pulse width setting means 159, throttle full-open range discriminating means 160, engine low speed range discriminating means 161, fuel injection start timing setting means 162, timer means 163, and MP injector selecting and driving means 164, which have the same functions as the corresponding means 41, 42, 43, 44, 45, 57, 48, 49, 50, 46, 51, 52, 53, 54, 55 and 56 of the first embodiment shown in FIG. 1, respectively. Accordingly, the duplicate description will be omitted.

The control apparatus 131 is additionally provided with reference throttle opening degree setting means 150, injection mode selecting means 151, fuel deposition coefficient setting means 152, evaporation time constant setting means 153, desired air/fuel ratio setting means 154, single point fuel injection amount calculating means 155, single point fuel injection pulse width setting means 156 and single point injector driving means.

In the second embodiment, injection mode is changed between a multi point injection mode like the first embodiment and a single point injection mode to be described later in accordance with a throttle opening degree. Further, the feature of delaying the injection start timing described in the first embodiment is performed only in the MP injection mode.

Figure 13A:
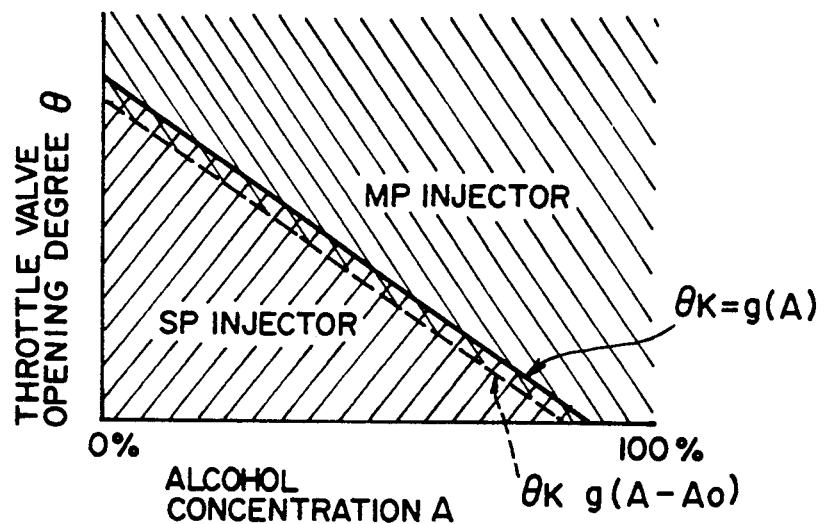
FIG. 13(a) illustrates the relationship between alcohol concentration and a fuel injection scheme.

In order to change the fuel injection scheme from the single point injection by the SP injector 110a to the multi point injection by the MP injector 110b as shown in FIG. 13 with respect to the fuel injection amount which increases with the alcohol concentration, the reference throttle opening degree setting means 150 reads a signal from the injector selecting means 151 to thereby discriminate which the MP injector 110b and the SP injector 110a is selected presently, and sets a reference throttle opening degree $\theta$K.

If the SP injector is selected, the reference throttle opening degree $\theta$K is obtained from a function g(A) relative to the alcohol concentration A which function is represented by a descending line as the alcohol concentration A rises ($\theta$K=g(A)). If the MP injector 110b is selected, the function g(A) is shifted toward the lower alcohol concentration A region by an off-set value AO (e.g., corresponding to 2 to 3 bits assuming that the resolution for the alcohol concentration A is 1 bit), to thereafter set the reference throttle valve opening degree ($\theta$K=g(A−AO)).

Figure 13B:
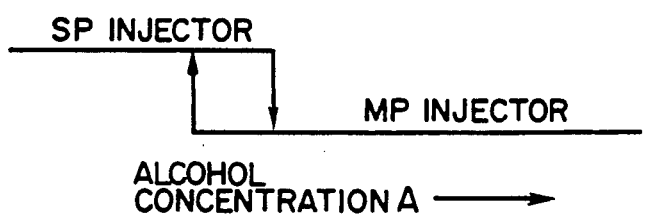
FIG. 13(b) illustrates switching characteristic of fuel injection mode at a constant throttle opening degree.

In the above manner, as shown in FIG. 13(b), a hysteresis is present upon switching between the SP injector 110a and the MP injector 110b. It is therefore possible to prevent abrupt fuel carburetion change and engine hunting at the time of switching between the single point injection mode and multi point injection mode.

The reference throttle valve opening degree $\theta$K may be set by searching a map by using the alcohol concentration A as a key parameter.

The injection mode selecting means 151 compares the throttle opening degree $\theta$ detected by the throttle opening sensor 109a with the reference throttle opening degree setting means 150. If $\theta < \theta$K, a calculation execution signal is outputted to the single point fuel injection amount calculating means 155 and the single point injection pulse width setting means 156, and a calculation interception signal is outputted to the basic fuel injection pulse width setting means 158, the multi point fuel injection pulse width setting means 159, the throttle full-open range discriminating means 160, the engine low speed range discriminating means 161 and the fuel injection start timing setting means 162, to thereby select the single point injection mode using the SP injector 110a and execute the fuel injection control as described hereinafter.

If $\theta \geq \theta$K, the injector selecting means 151 outputs the calculation interception signal to the single point fuel injection amount calculating means 155 and the single point fuel injection pulse width setting means 156, and the calculation execution signal to the basic fuel injection pulse width setting means 158. The multi point fuel injection pulse width setting means 159, the throttle full-open range discriminating means 160, the engine low speed range discriminating means 161 and the fuel injection start timing setting means 162, to thereby select the multi point injection mode using the MP injectors 110b and execute the fuel injection control in the same manner as the first embodiment.

In accordance with the throttle opening degree from the throttle opening degree sensor 109a and the coolant temperature Tw from the coolant temperature sensor 125, the fuel deposition coefficient setting means 152 sets a fuel deposition coefficient X which is used to correct the air/fuel ratio shifted by carburetion of fuel, which is supplied from SP injector 110a and deposited on the inner wall of the intake manifold 103.

Specifically, the lager the throttle opening degree $\theta$ and the lower the coolant temperature, the larger the amount of fuel liquid film deposited on the inner wall of the intake manifold 103. Accordingly, the actual amount of fuel supplied to the engine decreases correspondingly so that the fuel deposition coefficient X is set higher. The smaller the throttle opening degree $\theta$ and the higher the coolant temperature, the fuel deposition coefficient X is set lower.

The evaporation time constant setting means 153 sets an evaporation time constant $\tau$ of the evaporation of fuel deposited on the inner wall of the intake manifold 103, by using as parameters the engine speed N, the intake air amount Q and the coolant temperature Tw.

Specifically, the lower the coolant temperature Tw, the more the fuel will deposit on the inner wall of the intake manifold 103. The larger the amount of intake air during the engine low speed range (the larger the fuel injection amount), the longer the time required for evaporation of deposited fuel. Accordingly, the evaporation time constant $\tau$ is set longer. Conversely, if the coolant temperature Tw is high and the intake air amount is small during the engine high speed (the fuel injection amount is small), then the evaporation time constant $\tau$ is set shorter. In this manner, the fuel actually supplied to the engine is controlled.

The desired air/fuel ratio setting means 154 sets a desired air/fuel ratio A/F in accordance with a coolant temperature Tw signal from the coolant temperature sensor 125. This desired air/fuel ratio A/F is set to the rich side when the coolant temperature Tw is low during engine warming, and is set to a theoretical air/fuel ratio when the coolant temperature Tw becomes equal to or higher than a predetermined value after completion of engine warming.

In response to the calculation execution signal from the injection mode selecting means 151, the single point fuel injection amount calculating means 155 calculates a fundamental fuel injection amount in dependency on the intake air amount Q to follow the desired air/fuel ratio A/F set by the desired air/fuel ratio setting means 154 and then corrects the fundamental fuel injection amount by the increment coefficient COEF set by the increment coefficient setting means 146. In addition, the single point fuel injection amount calculating means 155 corrects the fundamental fuel injection amount in accordance with the fuel deposition coefficient X and the evaporation time constant $\tau$ to restore the air/fuel ratio shifted by carburetion of fuel deposited on the inner wall of the intake manifold 103, to thereby calculate a single point fuel injection amount Gf for a fuel made of 100% gasoline (Gf=f(Q, COEF, A/F, X, $\tau$)).

In response to the calculation execution signal from the injection mode selecting means 151, the single point fuel injection pulse width setting means 156 corrects the fuel injection amount Gf calculated by fuel injection amount calculating means 155 in accordance with the alcohol correction coefficient KAL set by the alcohol correction coefficient setting means 149 and the air/fuel feedback correction coefficient $\alpha$ set by the feedback correction coefficient setting means 14. The setting means also sets a single point fuel injection pulse width Tis corresponding to a fuel injection amount per one engine revolution in accordance with an injector coefficient KSP determined by injection characteristics of the SP injector 110a (Tis=KSP×$\alpha$Gf×KAL/N), and outputs a drive pulse signal corresponding to the single point fuel injection pulse width Tis to the SP injector 110a via the single point injector driving means 157 at a proper timing.

Operation

Next, the fuel injection control procedure of the control apparatus 131 will be described with reference to the flow chart shown in FIG. 14.

First, at a step S301, a crank pulse and cam pulses outputted from the crank angle sensor 122 and the cam angle sensor 124 are read. At a step S302, a corresponding cylinder is discriminated in accordance with the read cam pulses.

Thereafter at a step S303, upon interrupt by the cam pulse, a crank pulse is discriminated. At a step S304, the angular velocity $\omega$ is calculated from the time period between both crank pulses of the projections 21a and 21b and the difference angle ($\theta 1-\theta 2$) therebetween ($\omega=d(\theta 1-\theta 2)/dt$).

Next, at a step S305 the engine speed N is calculated from the angular velocity $\omega$ calculated at the step S304 (N=(60/2$\pi$)×$\omega$).

Thereafter at a step S306, a signal is read from the intake air amount sensor 108 to calculate the intake air amount Q. At a step S307, a coolant temperature Tw and a opening degree $\omega$ respectively outputted from the coolant temperature sensor 125 and the throttle opening degree sensor 109a and an output from the idling switch are read.

At a step S308, in accordance with the information read at a step S307, the increment coefficient COEF is set in association with the coolant temperature correction, the acceleration/deceleration correction, the full-open increment amount correction, the after.-idling increment amount correction, and the like.

Thereafter at a step S309, the air/fuel ratio feedback correction coefficient $\alpha$ is set in accordance with an output signal from the 02 sensor 127. At a step S310, the alcohol concentration A is calculated in accordance with an output signal from the alcohol concentration sensor 114. At a step S311, the alcohol correction coefficient KAL is set in accordance with the alcohol concentration A calculated at the step S310.

At a step S312 a flag FLAG is checked if it is 0 (zero), i.e., which injection mode is presently selected. If FLAG=0, i.e., if the single point injection mode is selected presently, the control advances from the step S312 to a step S313 whereat the reference throttle opening degree $\theta$K is determined from the function g(A) using the alcohol concentration A calculated at the step S310 ($\theta$K=g(A)), thereafter advancing to a step S315.

If FLAG 0 at the step S312, i.e., if the multi point injection mode is selected presently, the control advances from the step S312 to a step S314 whereat the reference throttle opening degree $\theta$K is determined from the function g(A) using a value shifted by the off-set value AO from the alcohol concentration A ($\theta$K=g(A−AO)), thereafter advancing to the step S315.

At the step S315, the throttle opening degree $\theta$ read at the step S307 is compared with the reference throttle opening degree $\theta$K set at the step S314. If $\theta<\theta$K, it is discriminatd as a single point injection range by the SP injector 110a, and the control advances to a step S316.

At the step S316, the desired air/fuel ratio A/F is set in accordance with the coolant temperature Tw. At a step S317, the fuel deposition coefficient X for the fuel injected from the SP injector and deposited on the inner wall of the intake manifold 103 is set in accordance with the throttle opening degree $\theta$ and the coolant temperature Tw.

Next at a step S318, the evaporation time constant $\tau$ of the fuel deposited on the inner wall of the intake manifold 103 is set in accordance with the intake air amount Q, the coolant temperature Tw and the engine speed N, thereafter advancing to a following step S319.

At the step S319, the fuel injection amount Gf for the single point injection for gasoline 100% (alcohol concentration 0%) is calculated, in accordance with the intake air amount Q calculated at the step S306, the increment coefficient COEF set at the step S308, the fuel deposition coefficient X set at the step S317 and the evaporation time constant $\tau$ set at the step S318, so as to make obtain the desired air/fuel ratio A/F set at the step S316 (Gf=f(Q, COEF, A/F, X, $\tau$)).

Next at a step S320, the fuel injection amount Gf calculated at the step S319 is corrected in accordance with the alcohol correction coefficient KAL set at the step S311 and the air/fuel feedback correction coefficient $\alpha$ set at the step S309. The single point fuel injection pulse width Tis corresponding to the fuel injection amount per engine one revolution is set in accordance with the injector coefficient KSP determined by the injection characteristics of the SP injector 110a (Tis=KSP×$\alpha$×Gf×KAL/N). At a step S321, a drive pulse signal of the single point fuel injection pulse width Tis is outputed to the SP injector 110a at a proper timing.

At a step S321, since the SP injector 110a is presently selected, FLAG is cleared (FLAG=0) to exit the program.

If $\theta \geq \theta K$ at the step S315, it is discriminated as a multi point injection range so that the control advances from the step S315 to a step S323. The basic fuel pulse width Tp for the MP injectors 110b is set in accordance with the engine speed N calculated at the step S305 and the intake air amount Q calculated at the step S306 (Tp =KMP×Q/N, where KMP is a theoretical air/fuel ratio which is an inverse of a constant determined from the injection characteristics of the MP injector 110b, the number of cylinders and the like), thereafter advancing to a step S324.

At the step S324, the multi point fuel injection pulse width Tim for the MP injectors 110b is set in accordance with the basic fuel injection pulse width Tp set at the step S323, the increment coefficient COEF set at the step S308, the air/fuel ratio feedback correction coefficient $\alpha$ set at the step S309, and the alcohol correction coefficient KAL set at the step S311 (Tim=Tp ×COEF×$\alpha$×KAL).

Next, at a step S325, the throttle opening degree $\theta$ read at step S307 is compared with the predetermined reference throttle opening degree $\theta s$. If $\theta > \theta s$, it is discriminated as the throttle full-open range and the control advances to a step S326. If $\theta \leq \theta s$, it is discriminated as other than the throttle full-open range and the control advances to a step S327.

At the step S326 the engine speed N calculated at the step S305 is compared with the predetermined reference engine speed Ns. If N>Ns, it is discriminated as a medium and high speed range and the control advances to the step S327. If N≤Ns, it is discriminated as the low speed range and the control advances to a step S328.

At the step S327, the fixed fuel injection start crank angle is set as the fuel injection start crank angle $\theta AN$, i.e., a normal injection timing is set.

If it is discriminated at the steps S325 and S326 as the throttle full-open range and as the low speed range, the control advances to the step S328 whereat the fuel injection start crank angle map MP$\theta$AN is searched by using as the parameter the alcohol concentration A calculated at the step S310, to thereby set the fuel injection start crank angle $\theta AN$.

Next, at a step S329 the fuel injection start timing TING is calculated in accordance with the fuel injection 5 start crank angle $\theta AN$ set at the step S327 or the step S328 and the angular velocity $\omega$ calculated at the step S304 (TING=$\theta AN/\omega$).

Thereafter at a step S330 the fuel injection start timing TING calculated at the step S329 is set at a timer of the timer means 163. At a step S331 the timer is driven upon reception of a trigger signal as the crank pulse at the projection 21c.

At a step S332, a drive pulse corresponding to the MP fuel injection pulse width Tim set at the step S324 is outputted to the MP injector 110b of the corresponding cylinder, when the timer driven at the step S331 reaches the fuel injection start timing TING. Thereafter at a step S333 the flag FLAG is set (FLAG=1) to indicate that multi point injection mode is presently selected, to then exit the program.

In the above manner, the fuel injection amount increasing with the alcohol concentration A is controlled by switching between the single point injection mode by the SP injector 110a and the multi point injection mode by the MP injectors 110b in accordance with the throttle opening degree $\theta$. In the relatively small fuel injection amount range, the single point injection mode is carried out to enhance carburetion of fuel and obtain stable fuel combustion.

For the multi point injection mode, as shown in FIG. 5, the higher the alcohol concentration A the more the fuel injection start timing TING at the throttle full-open range and the low speed range, i.e., during a low speed, high load running, is delayed from the normal fixed fuel injection start crank angle within the exhaust air stroke to the intake air stroke side. Accordingly, carburetion of fuel in the intake manifold 103 is suppressed and the carburetion time is shortened, resulting in good volumetric efficiency. Further, fuel combustion is optimized since the injection timing is changed with the alcohol concentration A.

During the running conditions other than the low speed, high load running, the injection timing similar to conventional is set, i.e., fuel is injected before the intake stroke, thereby improving carburetion and stabilizing combustion.

Figure 15:
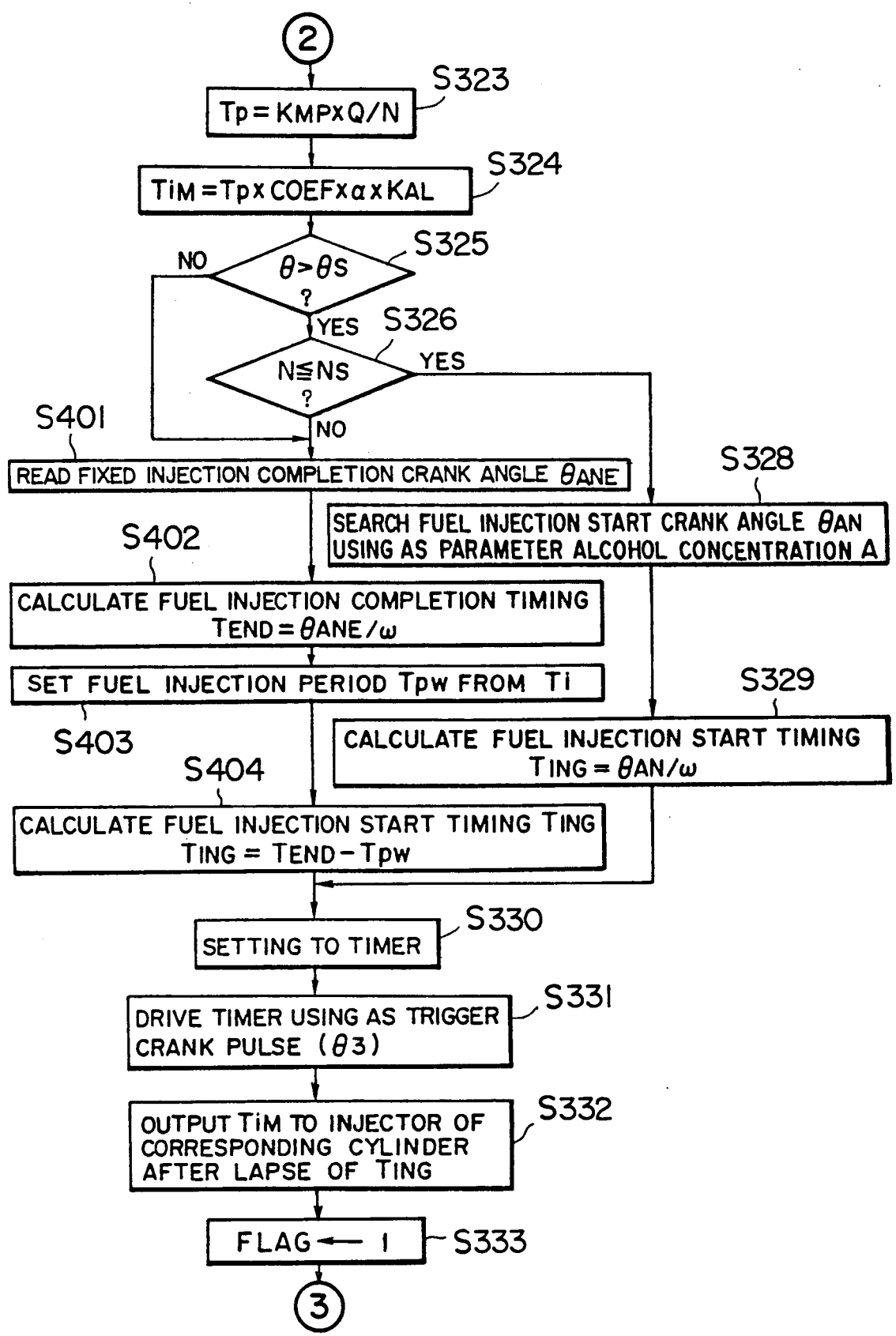
FIG. 15 is another example of the flow chart.

FIG. 15 is a flow chart where the fuel injection end timing is fixed during the running conditions other than the low speed, high load running, for the case of the multi point injection by MP injector 110b.

Figure 14A:
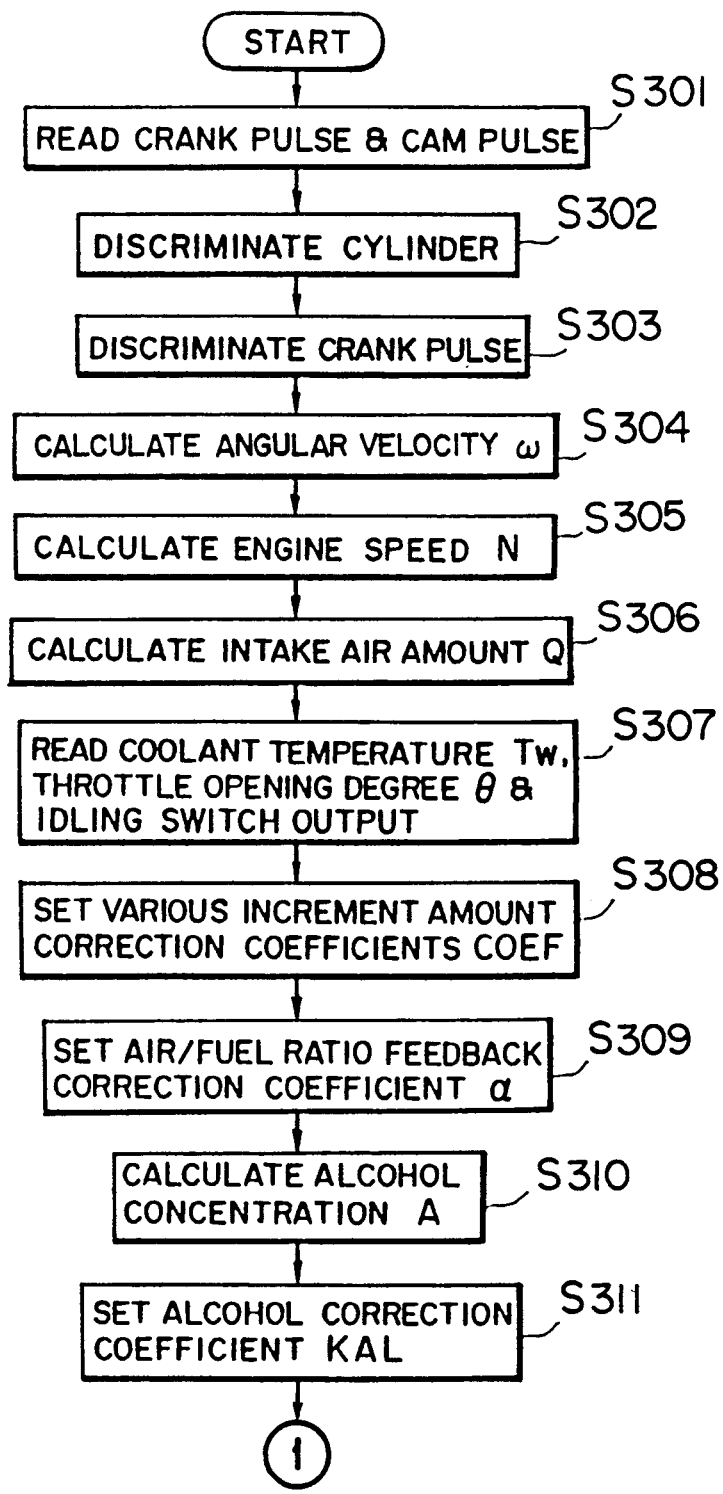
FIGS. 14A-14C are a flow chart showing the fuel injection control procedure of the second embodiment
Figure 14B:
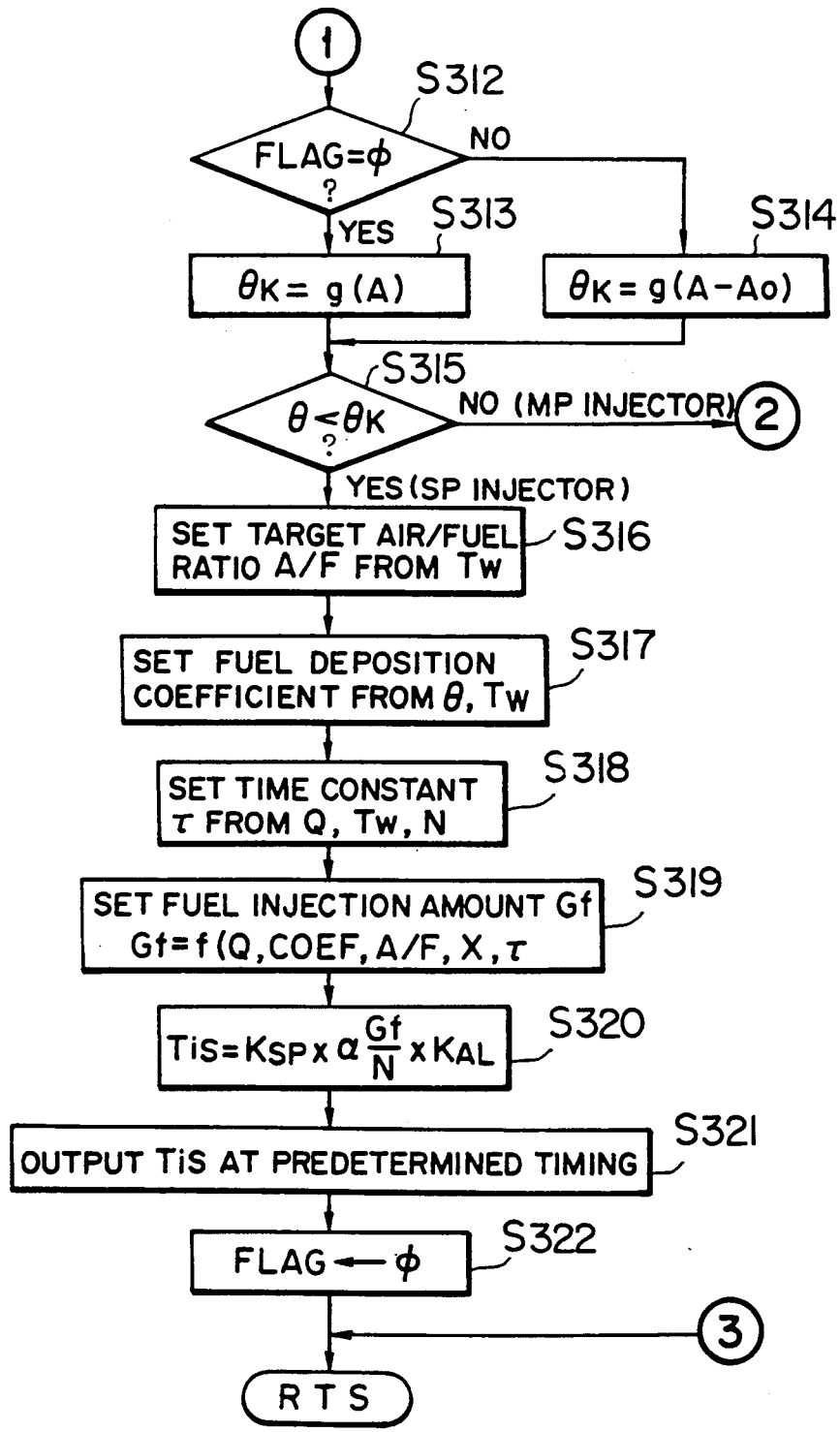
Figure 14C:
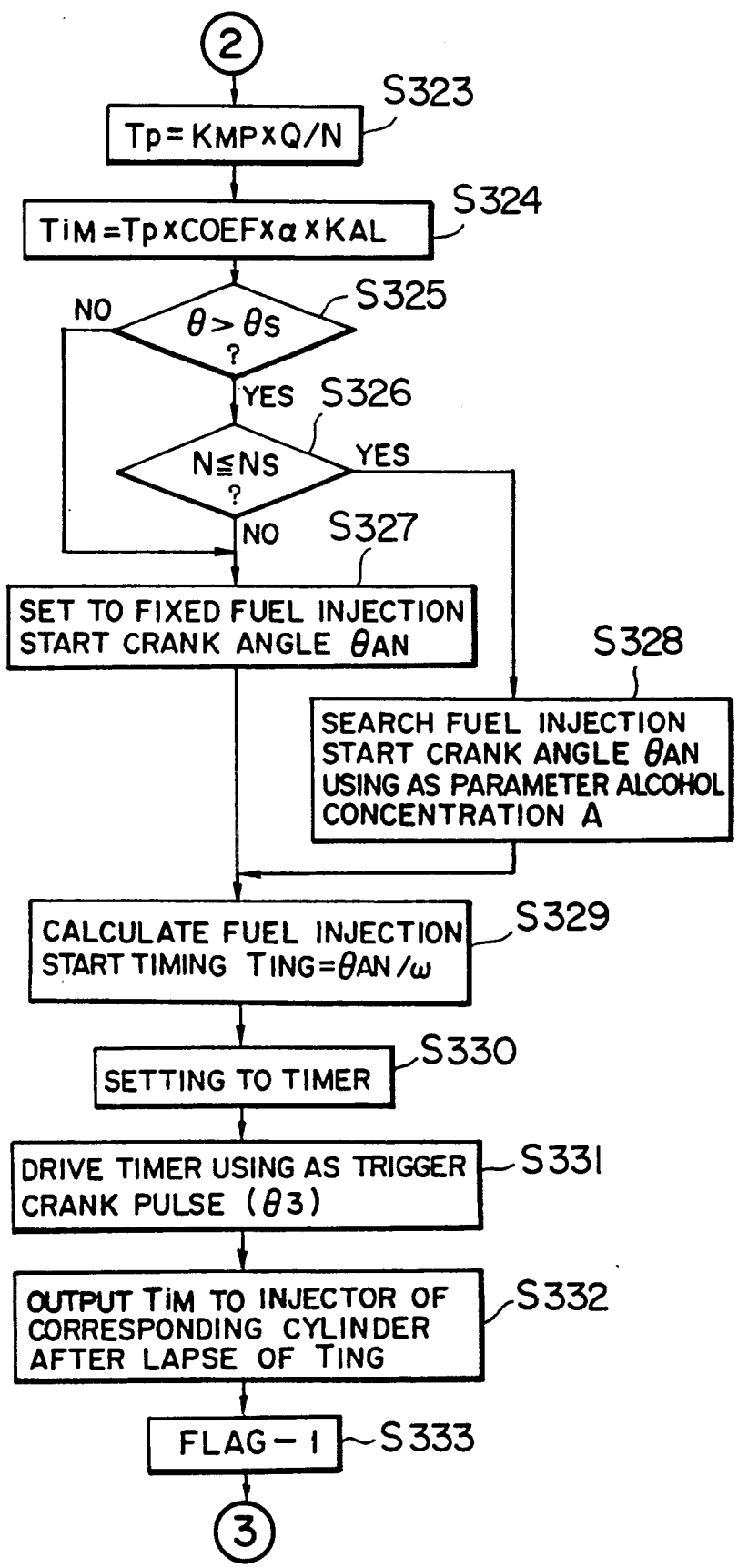

This flow chart differs from that shown in FIG. 14 in the processes (2) to (3) only. If it is discriminated other than the throttle full-open range at the step S325 $\theta \leq \theta s$) or if it is discriminated other than the low speed range at the step S326 (N>Ns), then the control advances to a step S401 whereat a predetermined fixed fuel injection end crank angle $\theta ANE$ is read, and at a step S402 a fuel injection end timing TEND is calculated in accordance with the fixed injection end crank angle $\theta ANE$ read at the step S401 and the angular velocity calculated at the step S304 (TEND=$\theta ANE/\omega$).

The fixed injection end crank angle $\theta ANE$ is a crank angle relative to a reference point (zero point) of the projection 21c as shown in FIG. 10.

At a step S403 the fuel injection period Tpw is set in accordance with the fuel injection amount Tim set at the step S324.

At a step S404, the fuel injection start timing TING is calculated in accordance with the fuel injection end time TEND calculated at the step S402 and the fuel injection period Tpw calculated at the step S403 (TING=TEND−Tpw).

At the step S330, the fuel injection start timing TING calculated at the step S404 is set to the timer.

In the embodiment shown in the figures, the fuel injection control by the time control scheme has been described. This invention is also applicable to the fuel injection control through the angle control scheme.

As seen from the foregoing description of the embodiment of this invention, reference throttle opening degree setting means sets the reference throttle opening degree in accordance with the alcohol concentration of the fuel, the throttle opening degree from the throttle opening degree sensor is compared with the reference throttle opening degree, and if the detected throttle opening degree is smaller than the reference throttle opening degree, the single point injection at the intake manifold is selected. Alternatively, if the detected throttle opening degree is equal to or larger than the reference throttle opening, the multi point injection at the intake port at each cylinder is selected. Accordingly, the injection amount which is required more as the alcohol concentration of the fuel increases, can be satisfied without using a specific injector.

If the multi point injector is selected, the throttle full-open range is discriminated in accordance with the throttle opening degree from the throttle opening degree sensor, and the engine low speed range is discriminated in accordance with the predetermined reference engine speed. If it is discriminated as the throttle full-open range and as the engine low speed range, the fuel injection start timing for the multi point injector is delayed more the higher the fuel alcohol concentration. Accordingly, carburetion of alcohol fuel during the low speed, high load running can be suppressed, and the carburetion time can be shortened.

As a result, it is possible to prevent the volumetric efficiency from being lowered during the low speed, high load running, to thereby ensure proper combustion, improved running performance and exhaust emission.

While the presently preferred embodiments of the present invention have been shown and described it is to be understood that these disclosures are for the purpose of illustration and that various changes and modifications may be made without departing from the scope of the invention as set forth in the appended claims.

What is claimed is:

1. A fuel injection control apparatus of an engine for injecting a mixed fuel containing gasoline and alcohol, comprising:
   a throttle opening degree sensor for detecting an actual throttle opening degree;
   a crank angle sensor for producing a crank pulse at a predetermined crank angle;
   engine speed calculating means responsive to said crank pulse for calculating an engine speed;
   throttle full-open range discriminating means responsive to said actual throttle opening degree for discriminating a throttle full-open range;
   engine low speed range discriminating means for discriminating an engine low speed range in accordance with said engine speed;
   an alcohol concentration sensor for detecting an alcohol concentration of the fuel; and
   fuel injection start timing setting means for delaying a fuel injection start timing in accordance with an increasing of said alcohol concentration, when said throttle full-open range discriminating means discriminates said throttle full-open range and said engine low speed range discriminating means discriminates said engine low speed range so as to prevent the volumetric efficiency from being lowered during the low speed, high load running.

2. The apparatus according to claim 1, wherein said fuel injection start timing setting means includes a fuel injection start crank angle map storing a plurality of fuel injection start crank angles so as to delay said fuel injection start timing in the direction from an air exhaust stroke to an air intake stroke in accordance with said alcohol concentration.

3. The apparatus according to claim 2, wherein said fuel start timing setting means includes:
   fuel injection start crank angle searching means responsive to said alcohol concentration for reading one of the fuel injection start crank angles from said fuel injection start timing crank angle map; and
   fuel injection start timing calculating means for calculating said fuel injection start timing in accordance with said one of the fuel injection start crank angles.

4. The apparatus according to claim 1, further comprising:
   multi point injectors disposed at intake ports of the cylinders, respectively, for injecting the fuel.

5. The apparatus according to claim 4, further comprising:
   a single point injector mounted on an intake pipe communicated with the respective cylinders;
   reference throttle opening degree setting means for setting a reference throttle opening degree in accordance with said alcohol concentration;
   injection mode selecting means for comparing said actual throttle opening degree and said reference throttle opening degree and outputting a single point injection mode signal when said actual throttle opening degree is smaller than said reference throttle opening, and a multi point injection mode signal when said actual throttle opening degree is larger than said reference throttle opening degree;
   means responsive to the single point injection mode signal for setting a single point injection amount so as to start to inject the fuel of the single point injection amount at a fixed injection timing; and
   means responsive to the multi point injection mode signal for setting a multi point injection amount for each of the multi point injectors so as to start to inject the fuel of the multi point injection amount at a timing set by the fuel injection start timing setting means.

6. The apparatus according to claim 5, wherein said reference throttle opening degree setting means is adapted to set said reference throttle opening based on an increasing function of said alcohol concentration.

7. The apparatus according to claim 1, wherein said fuel injection start timing setting means is adapted to set said injection start timing to a predetermined fixed timing when the engine is operated outside of said throttle full-open range or said engine low speed range.

8. A fuel injection control apparatus of an engine for injecting a mixed fuel containing gasoline and alcohol, having a throttle opening degree sensor for detecting an actual throttle opening degree, a crank angle sensor for producing a crank pulse at a predetermined crank angle, an intake air amount sensor for detecting an intake air amount, a coolant temperature sensor for detecting a coolant temperature, engine speed calculating means responsive to said crank pulse for calculating an engine speed, a single point injector provided in a connecting portion of each intake pipes communicated with each cylinders of the engine, and a plurality of multi point injectors adjacently disposed at each intake port of said cylinders, respectively, for injecting the fuel, said apparatus comprising:
   an alcohol concentration sensor for detecting an alcohol concentration of the fuel; and
   engine low speed range discriminating means for discriminating an engine low speed range in accordance with said engine speed;
   throttle full-open range discriminating means responsive to said actual throttle opening degree for discriminating a throttle full-open range;
   reference throttle opening degree setting means for setting a reference throttle opening degree in accordance with said alcohol concentration;

evaporation time constant setting means responsive to said engine speed, said intake air amount and said coolant temperature for setting an evaporation time constant;

fuel deposition coefficient setting means responsive to said actual throttle opening degree and said coolant temperature for setting a fuel deposition coefficients;

desired air-fuel ration setting means responsive to said coolant temperature for setting a desired air-fuel ratio;

injection mode selecting means for comparing said actual throttle opening degree and said reference throttle opening degree, and for outputting a single-point injection mode signal indicating a mode to perform single-point injection when said actual throttle opening degree is smaller than said reference throttle opening degree, and for outputting a multi-point injection mode signal indicating a mode to perform multi-point injection when said actual throttle opening degree is larger than said reference throttle opening degree;

single-point injection amount setting means responsive to said single-point injection mode signal for setting a single-point injection amount depending on said evaporation time constant, said fuel deposition coefficient, said desired air-fuel ratio and said intake air amount so as to start injecting the fuel of said single-point injection amount at a fixed injection timing;

fuel injection start timing setting means for delaying a fuel injection start timing for the multi-point injection against said fixed injection timing in accordance with the increasing of said alcohol concentration when said throttle full-open range discriminating means discriminates said throttle full-open range and said engine low speed range discriminating means discriminates said engine low speed range; and multi-point injection amount setting means responsive to said multi-point injection mode signal for setting a multi-point injection amount for each of said multi-point injectors so as to start injecting the fuel of said multi-point injection amount at a timing set by said fuel injection start timing setting means.

9. The apparatus according to claim 8, wherein said reference throttle opening degree setting means is adapted to set said reference throttle opening degree based on an increasing function of said alcohol concentration.

* * * * *